US009184865B2

(12) United States Patent
Akiyama

(10) Patent No.: US 9,184,865 B2
(45) Date of Patent: Nov. 10, 2015

(54) OPTICAL SWITCH, OPTICAL DEMODULATOR, AND OPTICAL DEMODULATION METHOD HAVING FEEDBACK CONTROL OF TEMPERATURE REGULATOR BASED ON OPTICAL DETECTOR OUTPUT

(75) Inventor: Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 389 days.

(21) Appl. No.: 13/613,297

(22) Filed: Sep. 13, 2012

(65) Prior Publication Data

US 2013/0161496 A1 Jun. 27, 2013

(30) Foreign Application Priority Data

Dec. 21, 2011 (JP) ................................. 2011-280574

(51) Int. Cl.
G01N 21/25 (2006.01)
H01J 7/24 (2006.01)
(Continued)

(52) U.S. Cl.
CPC ........... H04J 14/0212 (2013.01); G02F 1/0147 (2013.01); G02F 1/3132 (2013.01);
(Continued)

(58) Field of Classification Search
CPC ........... G02B 6/29361; G02B 6/12007; G02B 6/29395; G02B 6/29394; G02B 6/2938; G02B 2006/12164; G02B 6/29398; H01S 5/141; H01S 5/142; H01S 3/06791; H01S 5/026; H01S 5/0261; H01S 5/0262; H01S 5/0264; H01S 5/0612; H01S 3/1305; H01S 5/1071; H04J 14/0212; H04J 14/02; G02F 1/3132; G02F 1/0147; G02F 2202/101; G02F 2203/05; G02F 2202/105; G02F 2203/15; G02F 1/313; G02F 2201/58; G02F 2203/585; G02F 2203/58

USPC ........... 250/227.23, 227.11, 214 R, 238, 226; 398/68, 45, 182, 202, 214, 200, 196, 398/208, 209, 162, 137, 14, 95; 385/50, 4, 385/14, 5, 39, 40; 359/337.11, 337, 337.12; 372/94, 92, 34, 36, 35
See application file for complete search history.

(56) References Cited

U.S. PATENT DOCUMENTS 4,839,614 A * 6/1989 Hill et al. ...................... 359/238
5,629,792 A   5/1997 Masaki
(Continued)

FOREIGN PATENT DOCUMENTS

CN 1692295 11/2005
CN 1829012 9/2006
(Continued)

OTHER PUBLICATIONS

TWOA—Office Action dated Jun. 6, 2014 issued with respect to the corresponding Taiwanese Patent Application No. 101134229, with English-language translation.
(Continued)

Primary Examiner — Que T Le
Assistant Examiner — Jennifer Bennett
(74) Attorney, Agent, or Firm — Fujitsu Patent Center

(57) ABSTRACT

An optical switch includes a substrate, a ring resonator formed on the substrate, a first waveguide formed on the substrate in optical coupling with the ring resonator, the first waveguide being configured to guide a WDM signal, an optical detector configured to detect an optical signal component in said ring resonator, a temperature regulator driven in response to an output signal of the optical detector, the temperature regulator being configured to change a temperature of the ring resonator, the ring resonator having a resonant wavelength corresponding to a wavelength of an optical signal component that constitutes the WDM signal, the ring resonator, the optical detector and the temperature regulator constituting together a feedback control system that locks the resonant wavelength of the ring resonator to the wavelength of the optical signal component in the WDM signal.

13 Claims, 31 Drawing Sheets

(51) Int. Cl.
*H04J 14/02* (2006.01)
*G02F 1/01* (2006.01)
G02B 6/12 (2006.01)
G02F 1/313 (2006.01)
G02F 1/31 (2006.01)

(52) U.S. Cl.
CPC ............ *H04J 14/02* (2013.01); *G02B 6/12007* (2013.01); *G02F 1/313* (2013.01); *G02F 2001/311* (2013.01); *G02F 2201/06* (2013.01); *G02F 2201/58* (2013.01); *G02F 2202/101* (2013.01); *G02F 2202/105* (2013.01); *G02F 2203/05* (2013.01); *G02F 2203/15* (2013.01); *G02F 2203/58* (2013.01); *G02F 2203/585* (2013.01)

(56) References Cited

U.S. PATENT DOCUMENTS

| | | | |
|---|---|---|---|
| 5,892,616 | A * | 4/1999 | Takahashi ................ 359/341.43 |
| 6,701,033 | B2 | 3/2004 | Okayama |
| 7,373,045 | B2 | 5/2008 | Levner et al. |
| 7,389,028 | B2 | 6/2008 | Suzuki et al. |
| 7,664,156 | B2 | 2/2010 | Yamazaki |
| 7,977,622 | B2 * | 7/2011 | McLaren et al. ......... 250/227.11 |
| 8,139,281 | B1 * | 3/2012 | Wang et al. .................... 359/239 |
| 2003/0086174 | A1 | 5/2003 | Wakisaka et al. |
| 2006/0083144 | A1 | 4/2006 | Piede et al. |
| 2006/0196273 | A1 * | 9/2006 | Burns ............................ 73/702 |
| 2006/0198416 | A1 | 9/2006 | Yamazaki |
| 2009/0059973 | A1 * | 3/2009 | Suzuki ............................ 372/20 |
| 2009/0122817 | A1 * | 5/2009 | Sato et al. ....................... 372/20 |
| 2010/0200733 | A1 | 8/2010 | McLaren et al. |
| 2011/0142391 | A1 | 6/2011 | Asghari et al. |

FOREIGN PATENT DOCUMENTS

| | | |
|---|---|---|
| JP | 4-35330 | 2/1992 |
| JP | 5-203825 | 8/1993 |
| JP | 8-76068 | 3/1996 |
| JP | 2002-72260 | 3/2002 |
| JP | 2006-245344 | 9/2006 |
| JP | 2008-517332 | 5/2008 |
| JP | 2010-175743 | 8/2010 |
| JP | 2010-224189 | 10/2010 |
| TW | 200631267 | 9/2006 |

OTHER PUBLICATIONS

TWOA—Office Action mailed on Dec. 4, 2014 issued with respect to the corresponding Taiwanese Patent Application No. 101134229, with full English translation.

CNOA—Office Action mailed on Jan. 21, 2015 issued with respect to the corresponding Chinese Patent Application No. 201210376811.2 with full English translation.

JPOA—Office Action mailed on Jun. 30, 2015 issued with respect to the basic Japanese Patent Application No. 2011-280574, with partial English translated office action.

* cited by examiner

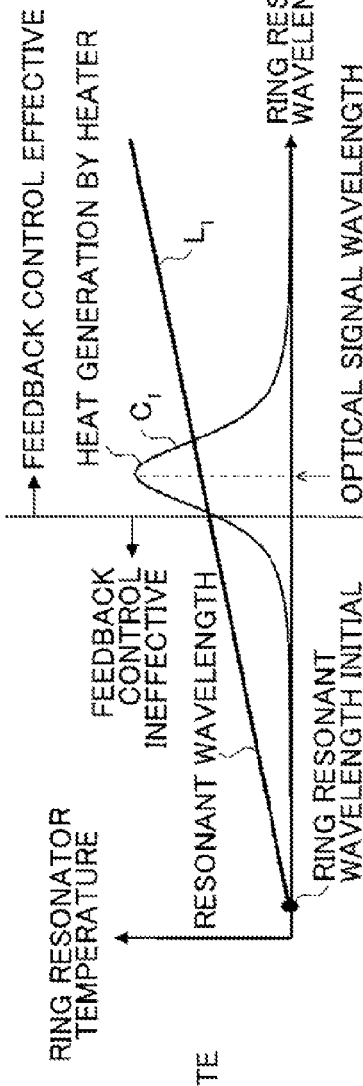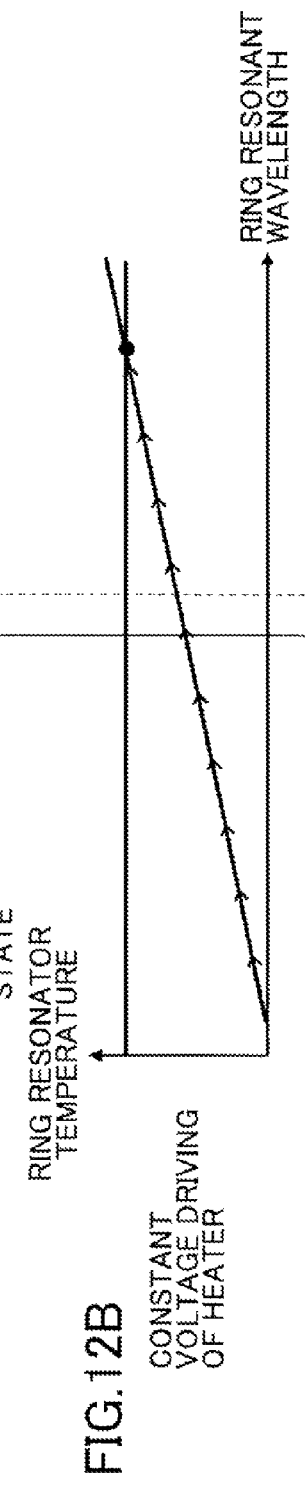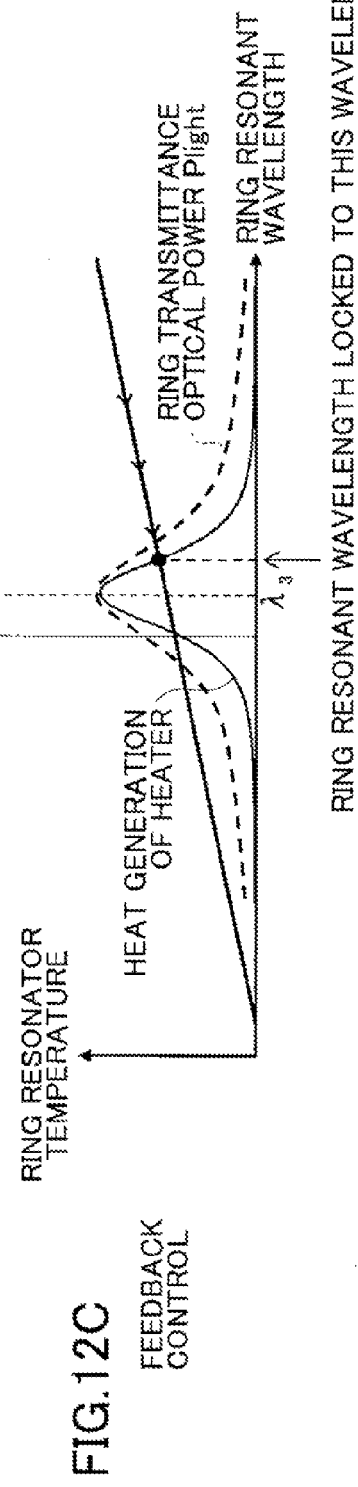

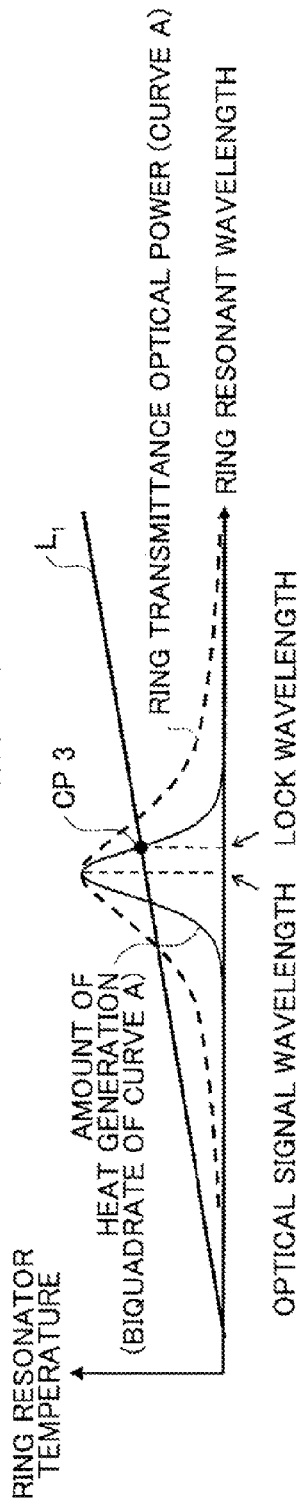
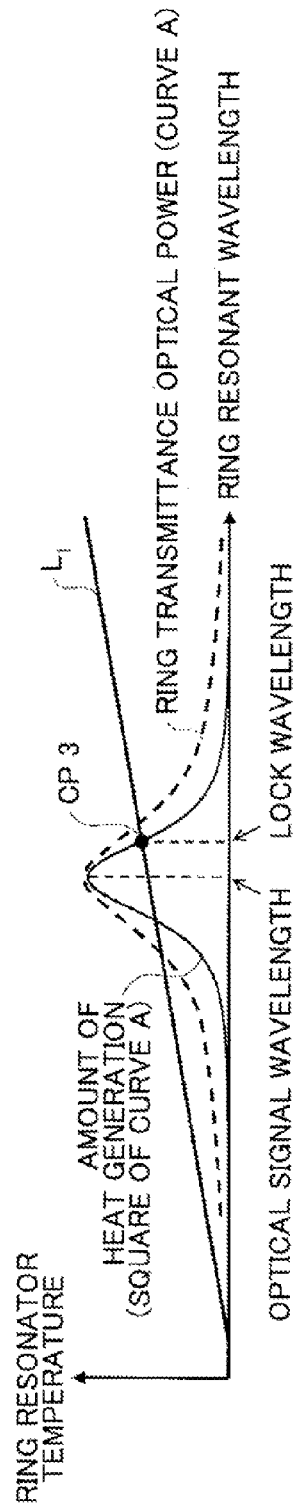

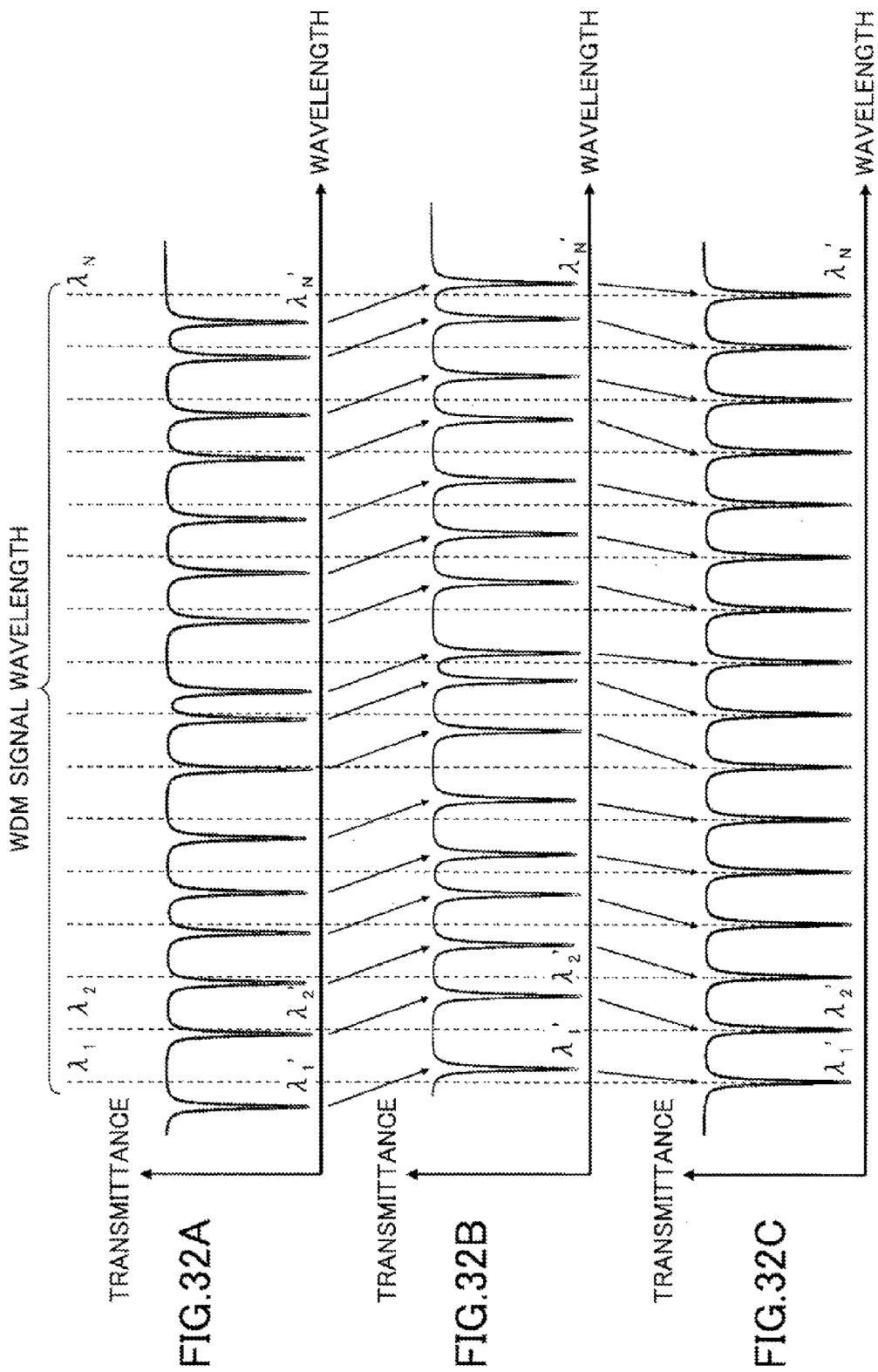

OPTICAL SWITCH, OPTICAL DEMODULATOR, AND OPTICAL DEMODULATION METHOD HAVING FEEDBACK CONTROL OF TEMPERATURE REGULATOR BASED ON OPTICAL DETECTOR OUTPUT

CROSS-REFERENCE TO RELATED APPLICATIONS

The present application is based upon and claims the benefit of priority from the prior Japanese Patent Application No. 2011-280574 filed on Dec. 21, 2011, with the Japanese Patent Office, the entire contents of which are incorporated herein by reference.

FIELD

The embodiments described herein generally relate to an optical switch, demultiplexer using such an optical switch and further optical demultiplexing method.

BACKGROUND

In large capacity optical fiber communication systems that use wavelength-division multiplex (WDM) technology, optical signals formed by a large number of optical sources of mutually different wavelengths are transmitted on a single optical fiber in the form of a WDM signal. Thus, a WDM signal includes a large number of channels of mutually different wavelengths, and the optical signals constituting the components of the WDM signals are transmitted through the respective channels in the form of signal components of the respective wavelengths. In such large-capacity optical fiber communication systems, optical switches are used for separating the optical signal component of a desired channel from the WDM signal transmitted through the optical fiber.

RELATED-ART DOCUMENTS

Patent Document

[Patent Document 1] Japanese Laid-Open Patent Application 2002-72260

SUMMARY

According to an aspect of the embodiment, an optical switch includes a substrate, a ring resonator formed on the substrate, a first waveguide formed on the substrate in optical coupling with the ring resonator, the first waveguide being configured to guide a WDM signal, an optical detector configured to detect an optical signal component in said ring resonator, a temperature regulator driven in response to an output signal of the optical detector, the temperature regulator being configured to change a temperature of the ring resonator, the ring resonator having a resonant wavelength corresponding to a wavelength of an optical signal component that constitutes the WDM signal, the ring resonator, the optical detector and the temperature regulator constituting together a feedback control system that locks the resonant wavelength of the ring resonator to the wavelength of the optical signal component in the WDM signal.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 12A-12C are diagrams explaining the wavelength lock operation in the optical switch of FIG. 1 corresponding to the flowchart of FIG. 11;

FIGS. 30A and 30B are diagrams explaining the wavelength lock operation attained in the optical switch of FIG. 24;

FIGS. 32A-32C are diagrams explaining the start operation of the demodulator of FIG. 31.

DESCRIPTION OF EMBODIMENTS

In the following, embodiments will be described with reference to the accompanying drawings.

First Embodiment

Figure 1:
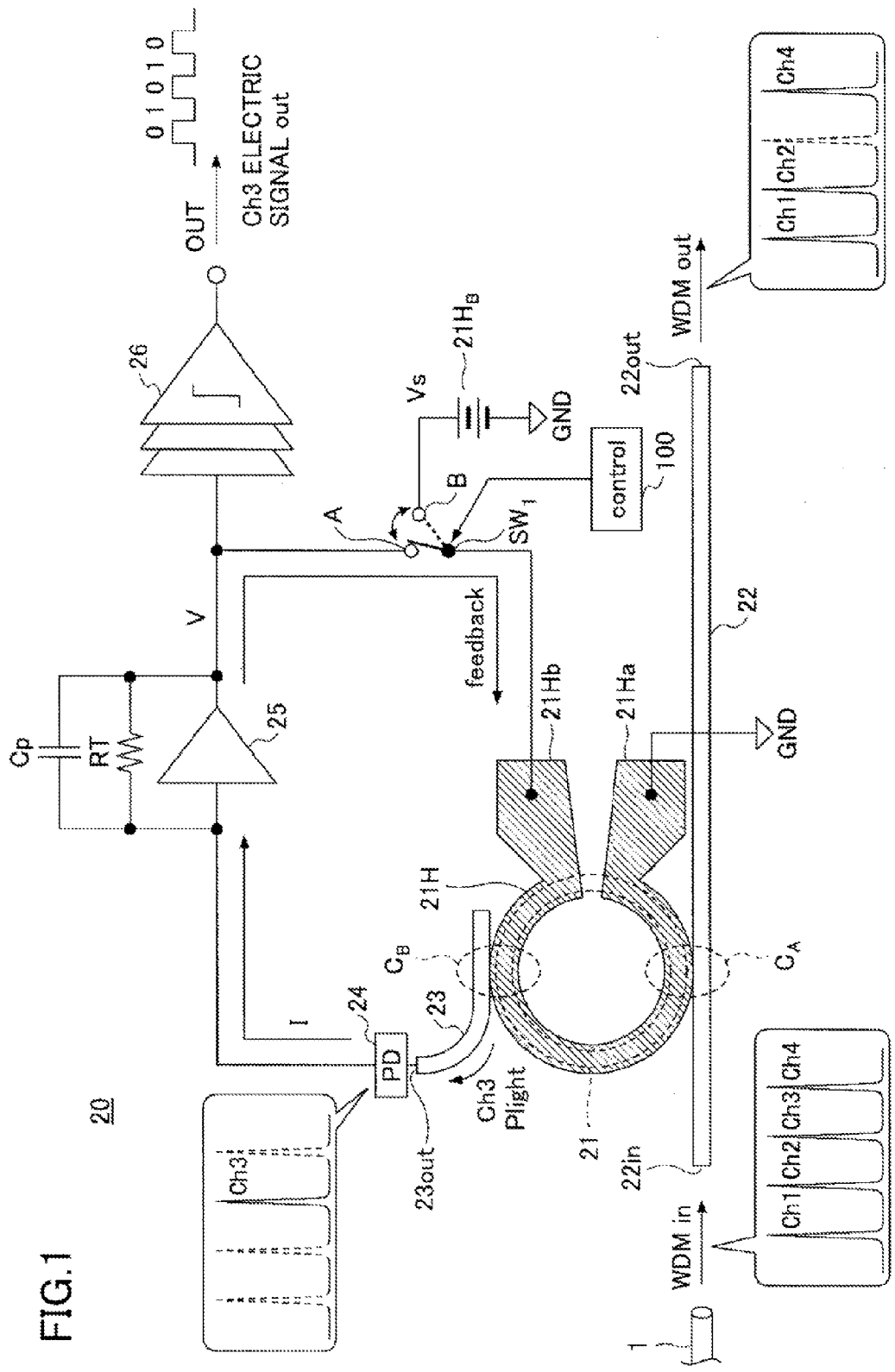
FIG. 1 is a block diagram representing the construction of an optical switch according to a first embodiment.
Figure 2:
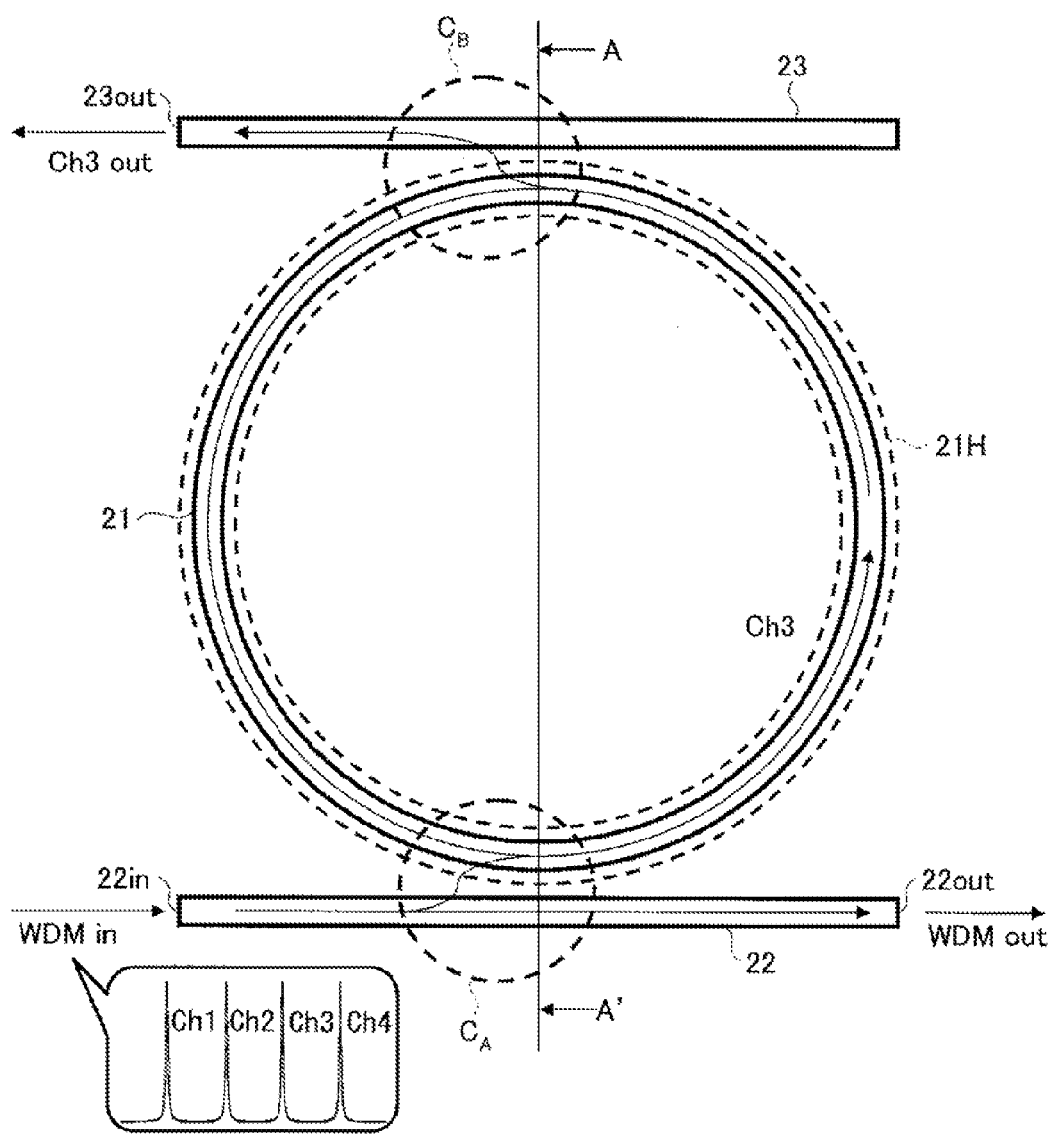
FIG. 2 is a plan view diagram representing a part of FIG. 1 in detail.
Figure 3:
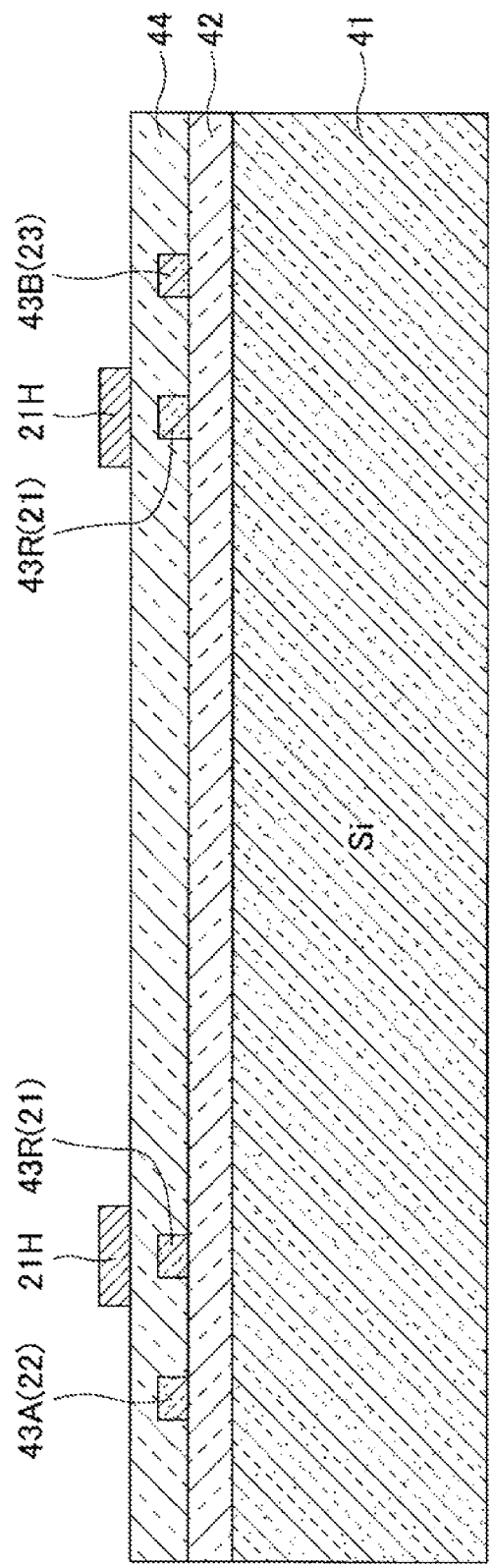
FIG. 3 is a cross-sectional diagram taken along a line A-A' of FIG. 2.
Figure 4:
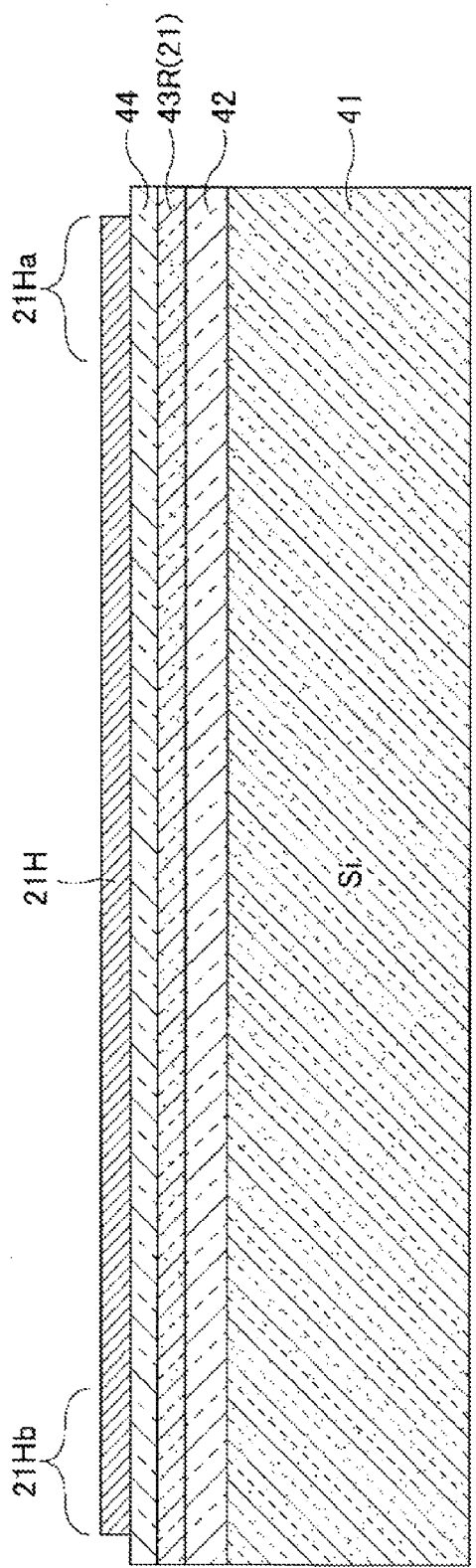
FIG. 4 is a cross-sectional diagram of a ring resonator of FIG. 2 taken along a circumferential direction of the ring resonator.

FIG. 1 is a block diagram representing the construction of an optical switch 20 according to a first embodiment, FIG. 2 is a plan view diagram representing a part of the optical switch 20 of FIG. 2 in detail, FIG. 3 is a cross-sectional diagram along a line A-A' of FIG. 2, and FIG. 4 is a cross-sectional diagram of the ring resonator represented in FIG. 2 taken along a circumferential direction.

Referring to FIGS. 1-4, the optical switch 20 is constructed on a silicon substrate 41 represented in FIGS. 3 and 4 and includes a ring resonator 21, a first optical waveguide 22 formed on the same silicon substrate 41 and having an edge surface 22in constituting an input port and an edge surface 22out constituting an output port, the first optical waveguide 22 being supplied with a WDM signal at the edge surface 22in from an external optical fiber 1, or the like, and in optical coupling with the ring resonator 21 at a coupling point $C_A$, a second optical waveguide 23 formed on the same silicon substrate 41 and coupled optically to the ring resonator at a coupling point $C_B$, the second optical waveguide 23 having an output port 23out, and a photodiode 24 detecting an optical signal power Plight in the second waveguide. The WDM signal supplied to the first optical waveguide 22 is a wavelength-division multiplexed signal and includes optical signal channels Ch1, Ch2, Ch3, Ch4 . . . of mutually different wavelengths. Further, the photodiode 24 produces an output current I in proportion to the optical signal power Plight.

Further, the ring resonator 21 is formed with a ring-shaped heater 21H in conformity with the shape of the ring resonator 21 such that the heater 21H has a ground terminal 21Ha and an input terminal 21Hb, and the output current I of the photodiode 24 is amplified and output as an output voltage V by a trans-impedance amplifier 25 that is equipped with a trans-impedance resistance RT and a feedback capacitance Cp. The output voltage V is supplied to the input terminal 21Hb of the ring-shaped heater 21H via a starter switch $SW_1$ to be explained later. The starter switch $SW_1$ is switched between a contact A and a contact B, and when the contact A is selected, a drive voltage V is supplied to the heater 21H from the trans-impedance amplifier 25. When the contact B is selected, on the other hand, a voltage from a starter voltage source 21HB is supplied to the heater 21H. In the description hereinafter, it will be assumed that the starter switch $SW_1$ is in the state to select the contact A unless noted otherwise. It should be noted that the starter switch $SW_1$ may be operated manually by an operator or may be driven by a control unit 100 such as a sequencer that uses a timer, for example.

The output signal of the photodiode 24 includes an electric signal of the desired channel separated by the ring resonator 21 such as the one corresponding to the optical signal component of the channel Ch3 and is supplied from the trans-impedance amplifier 25 to a limiting amplifier 26 for the purpose of signal reproducing. The limiting amplifier 26 is an amplifier constructed by a comparator and performs a threshold operation. Thus, the limiting amplifier 26 shapes the electric pulse signal into the form of a pulse signal of a predetermined voltage, wherein the pulse signal thus obtained is output from an output terminal OUT.

Referring to the cross-sectional diagrams of FIGS. 3 and 4, the silicon substrate 41 is constructed by an SOI (silicon-on-insulator) substrate that includes a silicon oxide film 42 in the form of a buried oxide (BOX: buried oxide) film, and there is formed a ring-shaped monocrystalline silicon pattern 43R in the silicon oxide film 42 as a core of the ring resonator 21. Further, in the vicinity of the silicon pattern 43R, there are formed monocrystalline silicon patterns 43A and 43B as the core of the optical waveguides 22 and 23, respectively.

The cores 43A, 43B and 43R are covered with a silicon oxide film 44 having a flat principal surface and functioning as the left and right claddings, and the ring-shaped heater 21H of preferably a refractory metal such as Ti or W is formed on the flat principal surface of the silicon oxide film 44 so as to cover the ring-shaped silicon pattern 43R preferably with a width slightly larger than that of the ring-shaped silicon pattern 43R. Further, it should be noted that the silicon oxide film 42 constitutes a lower cladding of the cores 43A, 43B and 43R.

In one example, the silicon oxide film 42 may have a film thickness of 2 μm-3 μm. The cores 43A, 43B and 43R are formed by patterning the silicon monocrystalline film on the silicon oxide film 42 by a dry etching process, or the like, and may have a height of 200 nm-250 nm and a width of 400 nm-550 nm in the case the WDM signal is an optical signal of 1.3 μm-1.5 μm band. Preferably, each of the cores 43A, 43B and 43R constitutes a single mode waveguide core by being surrounded, on the silicon oxide film 42, by the silicon oxide film 44 at the top surface and both lateral surfaces.

Further, in the case the WDM signal is an optical signal of the 1.3 μm-1.5 μm wavelength band, it is preferable that the cores 43A and 43R are disposed close with each other at the coupling point $C_A$ in the range of 50 nm-500 nm such that there is caused optical coupling in the optical signals guided through the cores 43A and 43R. Likewise, it is preferable that the cores 43B and 43R are disposed close with each other at the coupling point $C_B$ in the range of 50 nm-500 nm such that there is caused optical coupling in the optical signals guided through the cores 43B and 43R.

Thus, in the case the ring resonator 21 is tuned to the wavelength of the optical signal component of the channel Ch3 for example in the WDM signal, the energy of the optical signal component for the channel Ch3 is transferred to the ring resonator 21 at the coupling point $C_A$ as represented in FIG. 2 by an arrow and forms a resonant signal circulating in the ring resonator 21 in the direction of an arrow. On the other hand, other optical signal components in the WDM signal are guided along the optical waveguide 22 straight to the output terminal 22out. The energy of the optical signal component for the channel Ch3 thus transferred to the ring resonator 21 is then transferred to the optical waveguide 23 at the coupling point $C_B$, and thus, the optical signal component of the channel Ch3 originally guided through the optical waveguide 22 is now guided through the optical waveguide 23 in the direction of the arrow toward the output port 23Out.

Figure 6A:
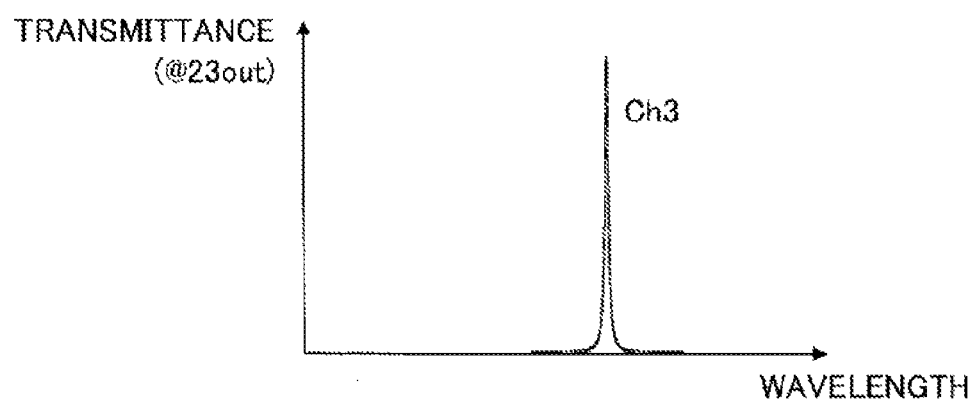
FIGS. 6A and 6B are diagrams representing a transmittance of the optical switch of FIG. 1.
Figure 6B:
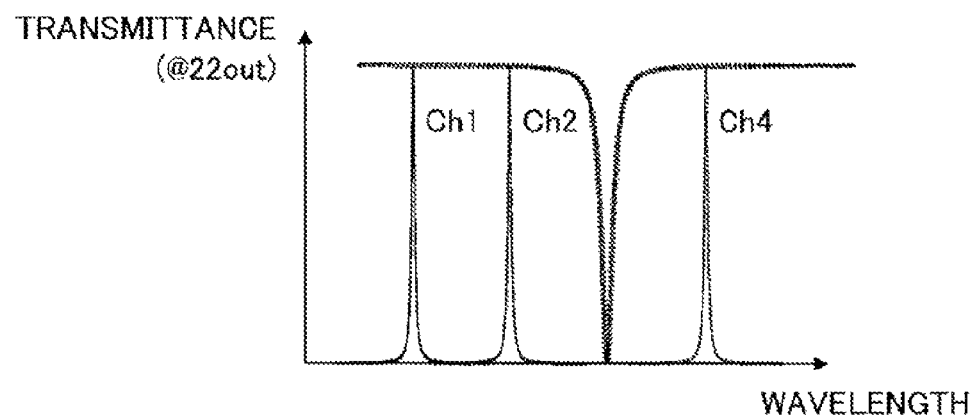

As a result, there appears the optical signal component of the channel Ch3 at the output port 23out of the waveguide 23 as represented in FIG. 6A. Further, there appears a WDM signal at an output port 22out of the optical waveguide 22 as represented in FIG. 6B. In FIG. 6B, it will be noted that the optical signal component for the channel Ch3 has been dropped out. It should be noted that FIG. 6A represents the wavelength dependence of the overall transmittance of the optical switch 20, and hence the wavelength dependence of the transmittance of the optical waveguide 22, the ring resonator 21 and the optical waveguide 23 as a whole, as viewed from the output port 23out of the optical waveguide 23, while FIG. 6B represents the wavelength dependence of the overall transmittance of the optical switch 20, and hence the wavelength dependence of the transmittance of the waveguide 22, as viewed from the output port 22out of the optical waveguide 22.

Figure 5:
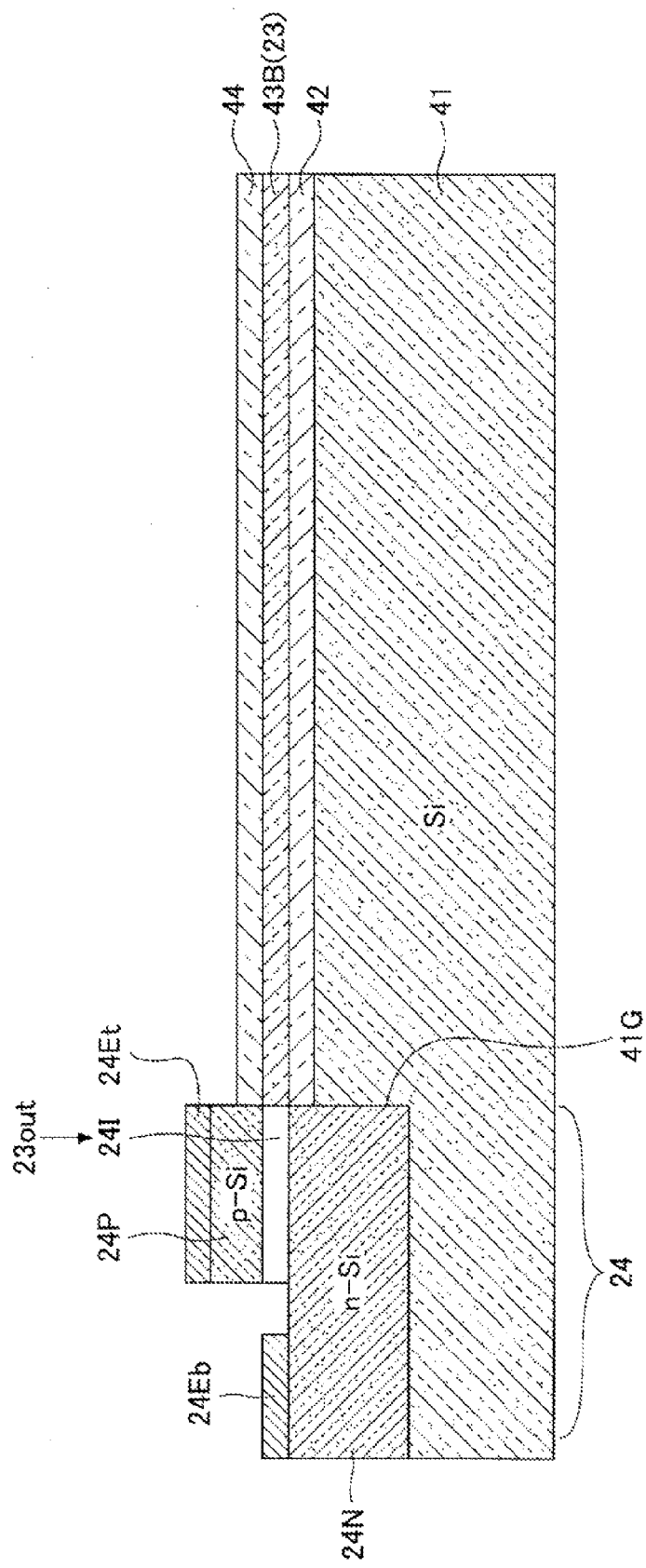
FIG. 5 is a cross-sectional diagram representing a photodiode in FIG. 1 along a cooperating optical waveguide.

FIG. 5 is a cross-sectional diagram representing the construction of the photodiode 24 coupled to the output port 23out of the optical waveguide 23.

Referring to FIG. 5, the silicon substrate 41 is formed with a trench 41G in correspondence to the output port 23out of the optical waveguide 23, and there is formed an n-type silicon layer 23N constituting the lower cladding layer of the photodiode 23 epitaxially in the trench 41G. On the n-type silicon layer 24N, there is formed an undoped SiGe mixed crystal layer 241 also epitaxially as an optical absorption layer in a butt-joint state to an end surface of the silicon pattern 43B. Further, there is formed a p-type silicon layer 24P epitaxially on the SiGe mixed crystal layer 241 as an upper cladding layer. On the p-type silicon layer 24P, there is formed an upper electrode 24Et, and there is further formed a lower electrode 24Eb on the n-type silicon layer 24N after removing a part of the SiGe mixed crystal layer 241 and the p-type silicon layer 24P.

In the construction of FIG. 5, it is possible to interchange the p-type silicon layer 24P and the n-type silicon layer 24N. Further, in place of the undoped SiGe mixed crystal layer, it is also possible to use undoped silicon layer or undoped germanium layer. Further, it is also possible to form the photodiode 24 by fitting a photodiode chip of a compound semiconductor such as GaAs or InP into the trench 41G.

In the construction of FIG. 1, it should be noted that the trans-impedance amplifier 25 is an amplifier converting a minute output current of the photodiode 24 into the output voltage V. For this purpose, the trans-impedance amplifier 25 is constructed by connecting an input end and an output end of an operational amplifier by the resistance $R_T$, which functions as a trans-impedance. The capacitor Cp is provided to stabilize the operation of the trans-impedance amplifier 25 by providing negative feedback.

The limiting amplifier 26 is an amplifier that produces a digital output from the output of the photodiode 24 in the form of binary signal of predetermined voltage amplitude by threshold operation and can be realized by a comparator.

Next, the operation of the optical switch 20 of FIGS. 1 and 2 will be explained for the case there is caused a temperature variation in the ring resonator 21 with reference to FIGS. 7A and 7B.

Figures 7A, 7B:
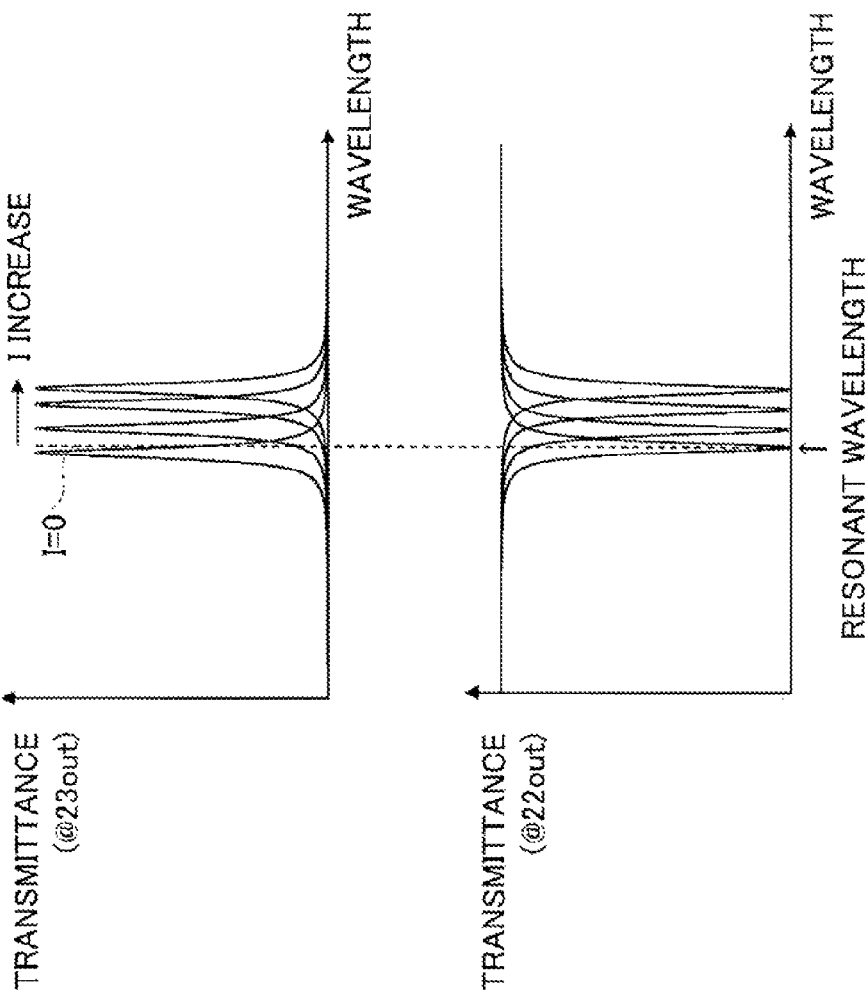
FIGS. 7A and 7B are diagrams representing a shift of resonant wavelength of the ring resonator in the optical switch of FIG. 1 caused by heating.

FIG. 7A is a diagram representing the transmittance of the optical switch 20 for the channel Ch3 as observed at the output port 23out for the case a drive current I is supplied to the heater 21H and the temperature of the ring resonator 21 is raised, while FIG. 7B represents the change of the transmittance of the similar optical switch 20 as observed at the output port 22out.

Referring to FIGS. 7A and 7B, it can be seen that there is caused a shift in the transmittance peak toward the longer wavelength side as the drive current I is increased from zero, which corresponds to an uncontrolled state. As explained before, such phenomenon is caused as a result of shift of resonant wavelength of the ring resonator 21 toward the longer wavelength side as a result of increase of the circuitous optical path length of the ring resonator 21, which in turn is caused by increase of the refractive index of the core 43R and the surrounding claddings as a result of increase of the temperature of the ring resonator 21.

Figure 8:
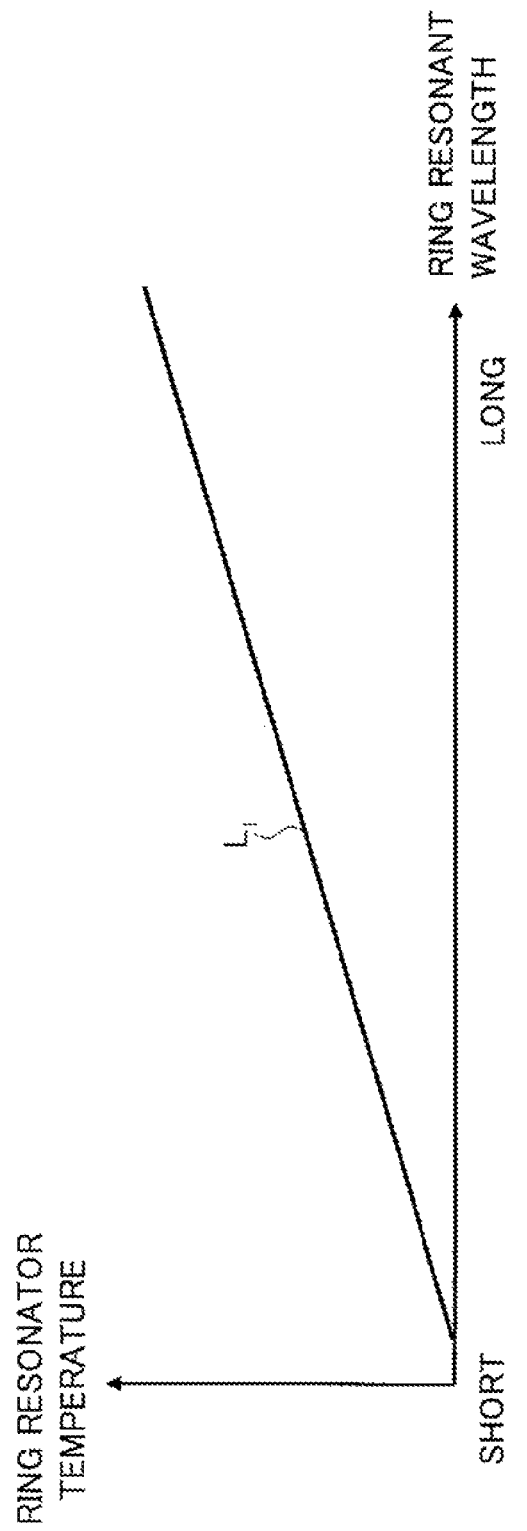
FIG. 8 is a diagram corresponding to FIGS. 7A and 7B representing a relationship between the ring resonator temperature and the resonant wavelength.

FIG. 8 is a diagram representing the relationship between the resonant wavelength of the ring resonator 21 and the temperature.

Referring to FIG. 8, it can be seen that the ring resonant wavelength causes shift toward the longer wavelength side along a line L1 with increase of temperature of the ring resonator 21.

Figure 9:
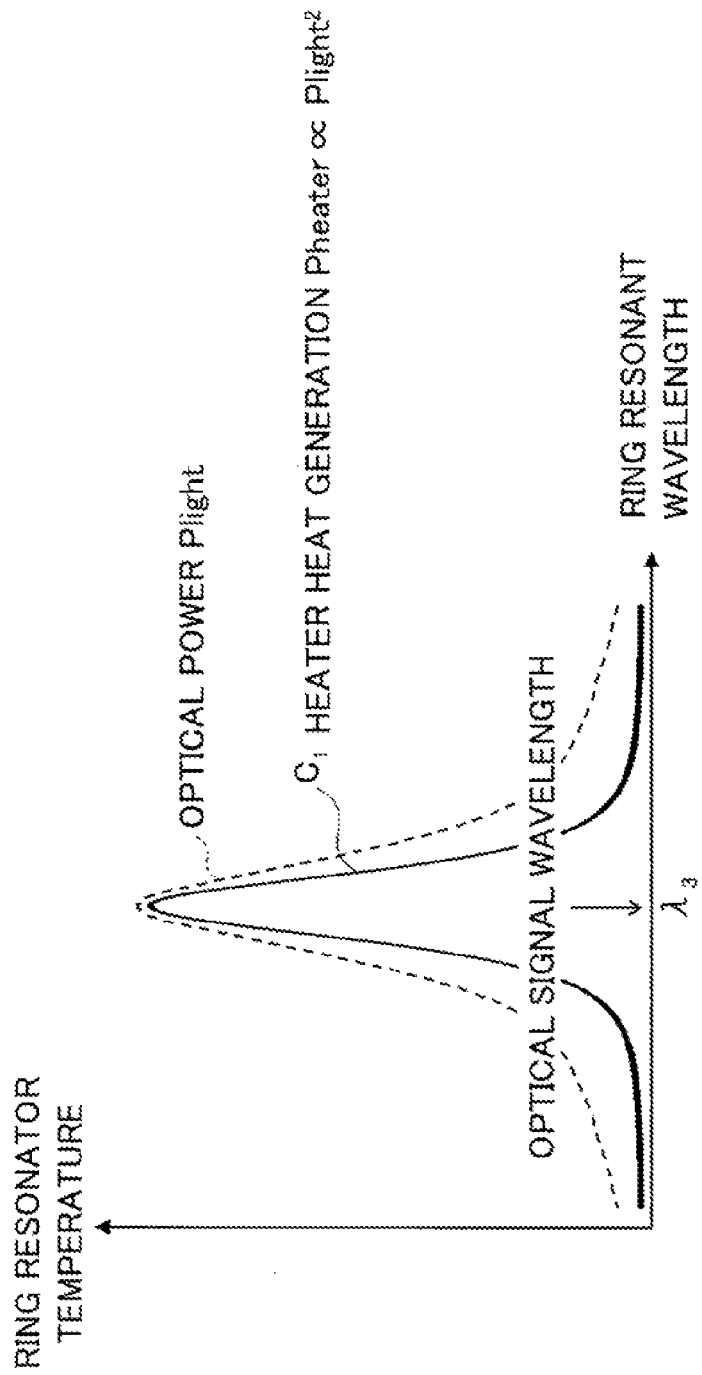
FIG. 9 is a diagram representing a relationship between the ring resonator temperature and the ring resonant wavelength in the optical switch of FIG. 1.

On the other hand, in the optical switch 20 of FIG. 1, it should be noted that the output voltage V of the trans-impedance amplifier 25, which is proportional to the output current I of the photodiode 24, is fed back to the heater 21H provided to the ring resonator 21 and the ring resonator 21 is heated in response thereto. Thus, the output current I of the photodiode 24 becomes maximum at the wavelength $\lambda_3$ of the optical signal component for the channel Ch3 separated from the WDM signal as represented in FIG. 9 by a broken line. The output current I is decreased at the shorter wavelength side and also at the longer wavelength side of the wavelength $\lambda_3$. In the construction of FIG. 1, in which the heater 21H is driven by the output voltage V of the trans-impedance amplifier 25, the power W supplied to the heater 21, and hence the heat generation of the heater 21H, becomes also maximum at the wavelength $\lambda_3$. The amount of heat generation in the heater 21H is proportional to the square of the output voltage V ($W = V \times I = V^2/R$; I being the current in the heater 21H, R being the resistance of the heater 21H), and thus, the heat generation in the heater 21H exhibits a wavelength dependence characterized by sharp peak at the optical signal wavelength $\lambda_3$ of the channel Ch3, much sharper than the optical power Plight detected by the photodiode 24.

Figure 10:
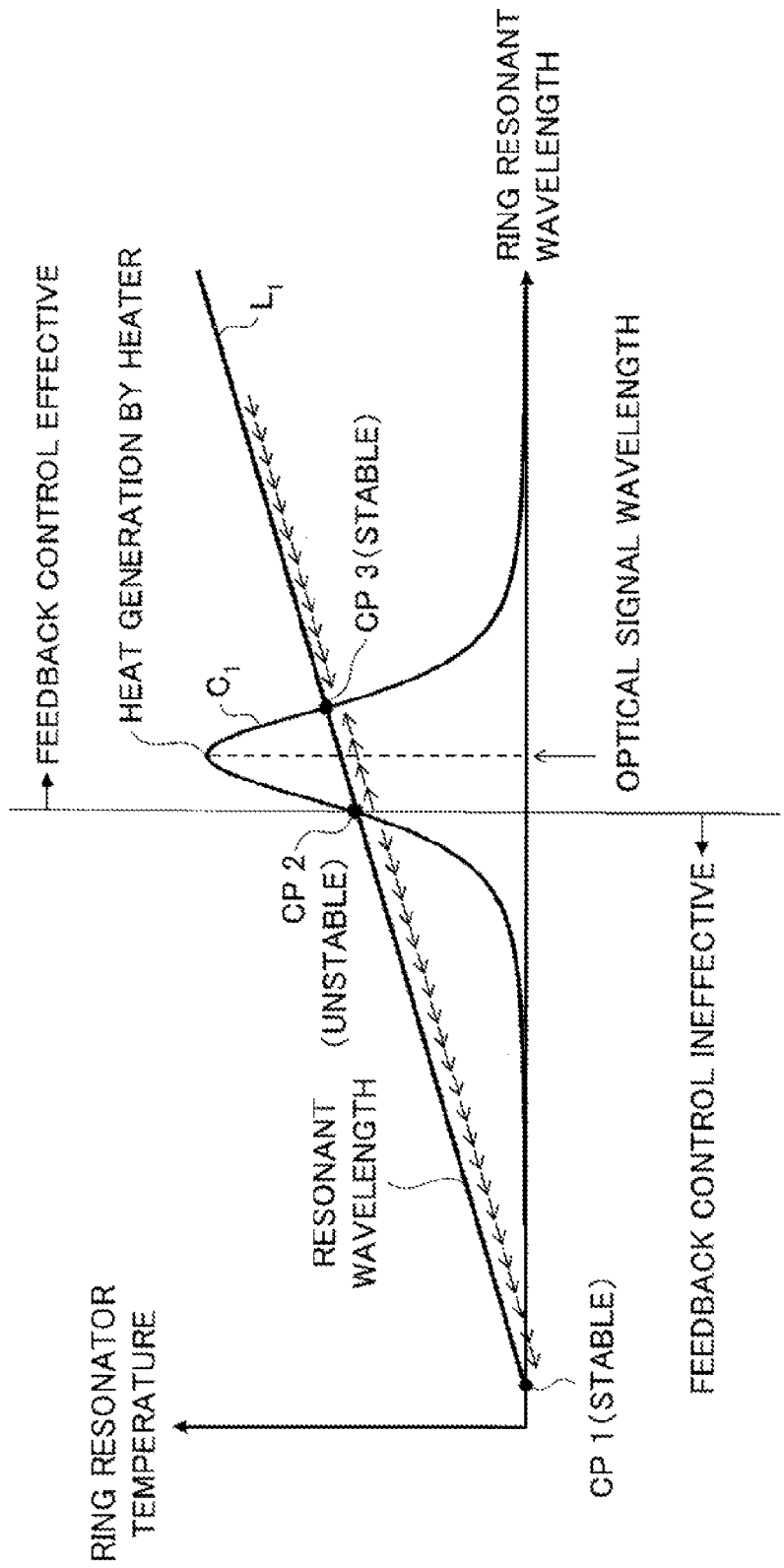
FIG. 10 is a diagram explaining a wavelength lock operation attained in the optical switch of FIG. 1.

FIG. 10 is a diagram in which the diagram of FIG. 9 is superimposed upon the diagram of FIG. 8.

Referring to FIG. 10, it can be seen that the resonant wavelength of the ring resonator 21 causes a shift toward the longer wavelength side along the line $L_1$ with increase of temperature of the ring resonator 21 as noted previously. On the other hand, in the case the resonant wavelength of the ring resonator 21 is located at a shorter wavelength side of a cross point represented in FIG. 10 as CP2 where the line $L_1$ crosses the curve $C_1$ at the shorter wavelength side with regard to the center of the curve $C_1$, there occurs a corresponding decrease of heat generation in the heater 21H when the temperature of the ring resonator 21 has been decreased, and thus, the temperature of the ring resonator 21 continues to decrease to a cross-point CP1 in which no heating is applied to the ring resonator 21. This means that the resonant wavelength of the ring resonator 21 is unstable at the cross-point 2 but is stable at the cross-point CP1. At the cross-point CP1, however, the resonant wavelength of the ring resonator 21 is determined by the environmental temperature of the optical switch 20 and is not tuned to the wavelength of the desired channel such as the wavelength of the channel Ch3.

In the case the ring resonator 21 is heated to a temperature such that the resonant wavelength thereof is located at a longer wavelength side of the cross-point CP2 in FIG. 10, a further increase of temperature causes a shift of the resonant wavelength of the ring resonator 21 toward the longer wavelength side, while such shift causes further increase of heat generation of the heater 21H, and as a result, there is caused further shift of the resonant wavelength of the ring resonator 21 toward the longer wavelength side. Now, when the resonant wavelength has been shifted toward the longer wavelength side beyond a cross-point CP3 in which the line $L_1$ crosses the curve $C_1$ at the longer wavelength side with regard to the center of the curve $C_1$, there is caused a decrease in the amount of heat generation in the heater 21H, and with this, there is caused a decrease of temperature for the ring resonator 21. As a result, the resonant wavelength of the ring resonator 21 is pulled back to the wavelength of the cross-point 3. Further, when the temperature of the ring resonator 21 has been lowered from the temperature of the cross-point CP3, the resonant wavelength of the ring resonator 21 causes a shift toward the shorter wavelength side, while such shift of the resonant wavelength toward the shorter wavelength side from the cross-point CP3 invites increase of heat generation in the heater 21H, and the temperature of the ring resonator 21 is increased again. As a result, the resonant wavelength of the ring resonator 21 is pulled back to the wavelength of the cross-point CP3.

Thus, with the present embodiment, the ring resonator 21, the heater 21H, the photodiode 24 and the trans-impedance amplifier 25 constitute a feedback loop that locks the resonant wavelength of the ring resonator 21 to the wavelength of the cross-point CP3.

Figure 11:
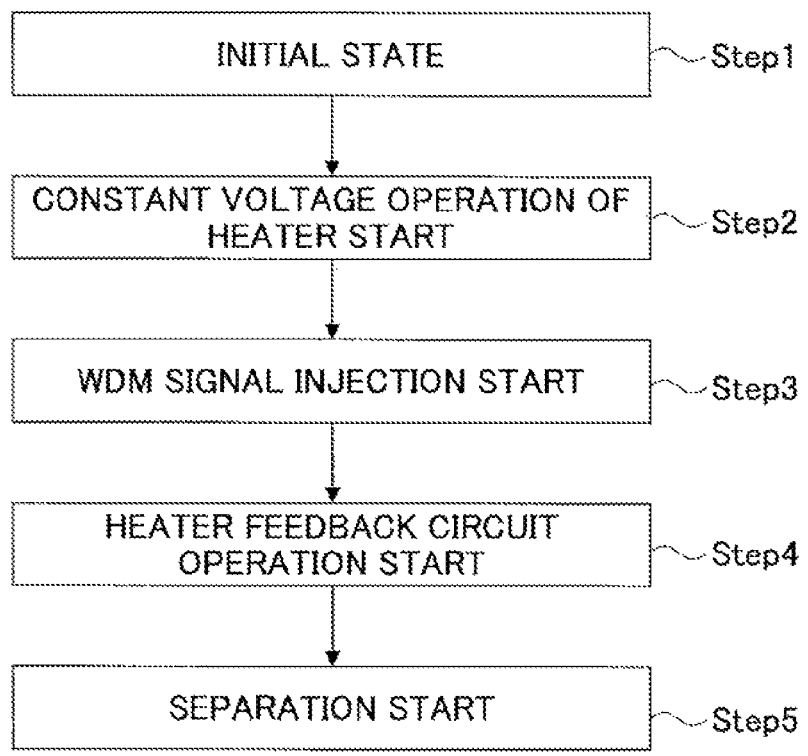
FIG. 11 is a flowchart explaining a start procedure of the optical switch of FIG. 1.

FIG. 11 is a flowchart explaining the starting procedure for starting the foregoing feedback operation for the optical switch 20 of FIG. 1.

Referring to FIG. 11, a step 1 is an initial state in which the ring resonator 21 is not heated, and it can be seen that the starter switch $SW_1$ explained in FIG. 1 selects the contact A. In this state, the temperature of the ring resonator 21 is coincident to the environmental temperature as represented in FIG. 12A, and thus, the ring resonator 21 has a resonant wavelength much shorter than the optical signal wavelength $\lambda_3$. Because the output of the photodiode 24 is zero in this state, there is caused no change of the resonant wavelength when the output of the photodiode 24 is fed back to the heater 21H.

Next, in a step 2 of FIG. 11, the starter switch SW1 selects the contact B as a result of operation of an operator for example, and a predetermined voltage Vs is supplied to the heater 21H from the starter voltage source 21HB. With this, there is caused temperature rise in the ring resonator as represented in FIG. 12B, and associated with this, there is caused a shift of the resonant wavelength toward the longer wavelength side. Thus, the operator monitors the temperature of the ring resonator 21 until the resonant wavelength reaches the wavelength of the cross-point CP2, or more simply until the temperature of the ring resonator 21 reaches a temperature in which the resonant wavelength becomes longer than the wavelength $\lambda_3$ of the optical signal component of the channel Ch3. In the example of FIG. 12B, the temperature of the ring resonator 21 is set to such a temperature that the resonant wavelength is much longer than the wavelength $\lambda_3$.

Next, in a step 3 of FIG. 11, injection of the WDM signal into the optical waveguide 22 is started. Because there is provided no optical switch between the input port 22 of the optical waveguide 22 and the optical fiber 1, it is possible to implement an equivalent process to such a process by way of driving the photodiode 24.

Further, in a step 4, the switch $SW_1$ is switched to the contact A, and with this, the feedback operation is started in a step 5.

While it has been explained that the operation of the switch $SW_1$ or the driving of the photodiode 24 in the flowchart of FIG. 11 is attained by the operation of an operator, it is also possible to implement such a process by a control unit 100, which may be a sequencer that uses a timer.

With the present embodiment, it will be noted from FIG. 12B, for example, that the lock wavelength of the ring resonator 21 is slightly offset from the wavelength $\lambda_3$ of the target optical signal component. As noted previously, the amount of heat generation of the heater 21H is proportional to a square of the optical power Plight detected by the photodiode 24, and thus, it should be noted that the proportion of the optical Power Plight at the lock wavelength is larger than the proportion of the heat generation of the heater at the lock wavelength. Thus, the photodiode 24 can obtain sufficient detection current I from the optical signal component of the target channel at the foregoing lock wavelength.

Figure 13:
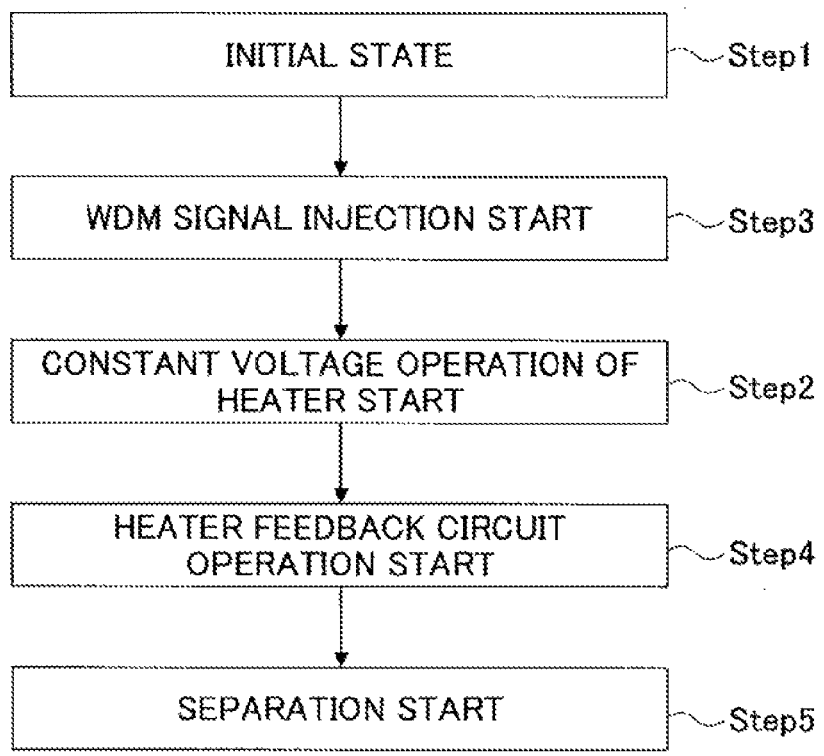
FIG. 13 is a flowchart representing a modification of the start procedure of FIG. 11.

As indicated in the modification of FIG. 13, the step 2 and the step 3 may be interchanged.

In the present embodiment, it should be noted that the substrate on which the optical switch 20 is constructed is not limited to the SOI substrate explained with reference to FIGS. 3 and 4 but it is also possible to use a substrate of other material such as a GaAs substrate or an InP substrate, as long as it is possible to form the optical waveguides 22 and 23 and the ring resonator 21 thereon. In the case of using a GaAs substrate in place of the silicon substrate 41, the cores 43A, 43B and 43R may be formed by InGaAs or InGaAsP and the cladding 44 may be formed by GaAs or AlGaAs. Further, in the case of using an InP substrate in place of the silicon substrate 41, the cores 43A, 43B and 43R may be formed by InGaAs, InAsP or InGaAsP and the cladding 44 may be formed by InP, InAlAs or InGaAlAs. In the case of forming the substrate 41, the cores 43A, 43B and 43R and the cladding 44 with such compound semiconductor materials, it becomes possible to form the photodiode by the epitaxial layers of these compound semiconductor devices, and the formation of the photodiode 24 becomes much easier.

Figure 14:
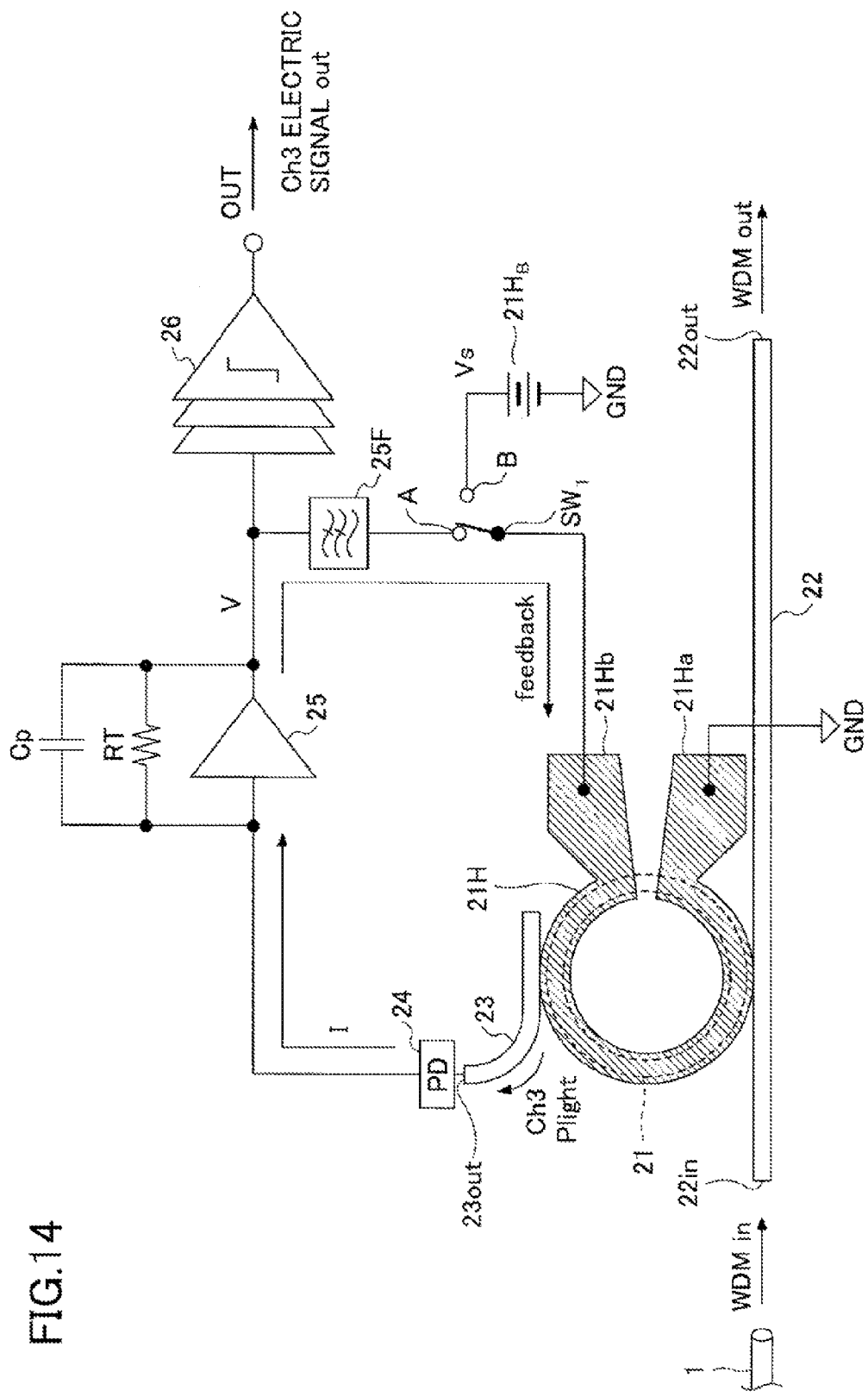
FIG. 14 is a block diagram representing a modification of the optical switch of FIG. 1.

In the present embodiment, it is also possible to provide a low-pass filter 25F in the signal path of the electric signal V branched out from the signal path from the trans-impedance amplifier 25 to the limiting amplifier 26 and is fed back to the heater 21H as represented in FIG. 14 representing a modification of the present embodiment. In the FIG. 14, those parts explained before are designated by the same reference numerals and the description thereof will be omitted.

The optical signals transmitted through the channels of a WDM signal are usually very fast signals and generally do not contain low-frequency components. On the other hand, in such a case that the signals transmitted through the channel $Ch_3$, for example, contains relatively low frequency signal components that may affect the operation of the heater 21H heating the ring resonator 21, it becomes possible to cutoff the effect of such relatively low-frequency signal components upon the heating operation of the heater 21 by providing such a low-pass filter 25F.

In the case the output voltage V of the trans-impedance amplifier 25 is small and the heater 21H cannot produce sufficient heat to attain the cross-point CP3 explained with reference to FIG. 10, there may be inserted a linear amplifier 27 amplifying the output voltage V of the trans-impedance amplifier 25 with a predetermined amplification factor between the trans-impedance amplifier 25 and the heater 21H. In the illustrated example, the linear amplifier 27 is inserted between the switch $SW_1$ and the terminal 21Hb of the heater 21H and amplifies the output voltage V with a predetermined amplification factor irrespective of the wavelength of the operational point. The linear amplifier 27 may also be inserted between the filter 25F and the switch $SW_1$. Further, with the present embodiment, the filter 25F may be omitted.

Figure 16:
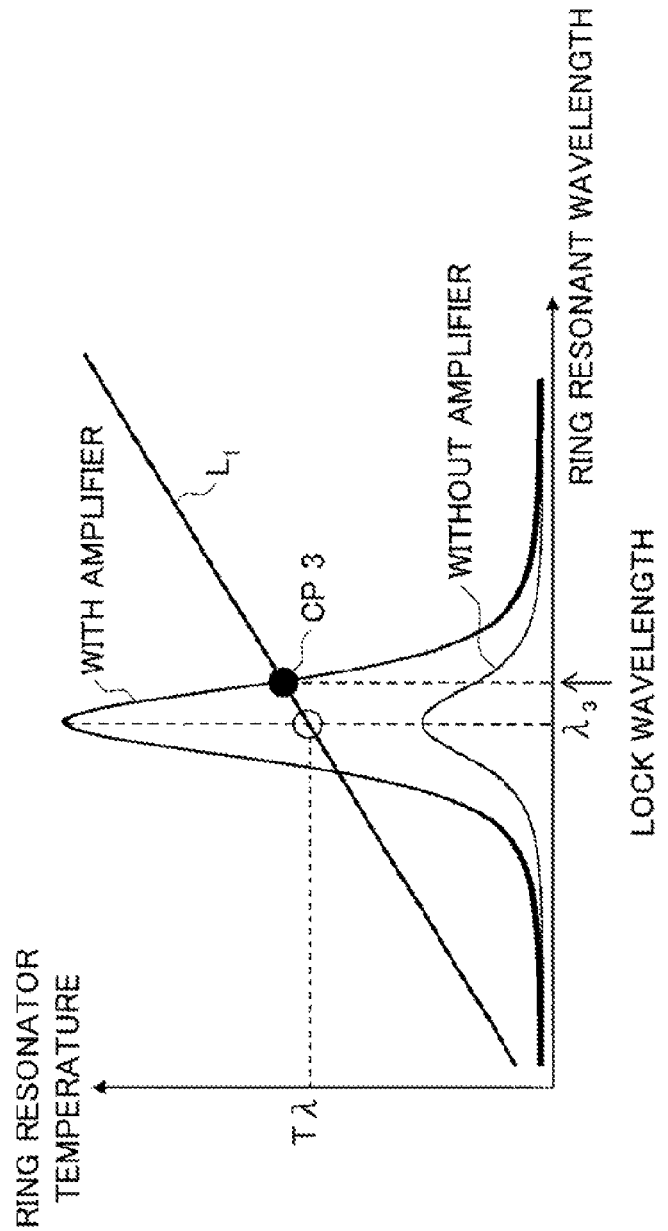
FIG. 16 is a flowchart explaining the operation of the optical switch of FIG. 15.

By providing such a linear amplifier 27, it becomes possible, in the case in which the temperature of the optical resonator 21 cannot be raised sufficiently by the output voltage of the trans-impedance amplifier 25 alone, to heat the optical resonator 21 to such a temperature that there appears a cross-point CP3 as represented in FIG. 16.

Figure 15:
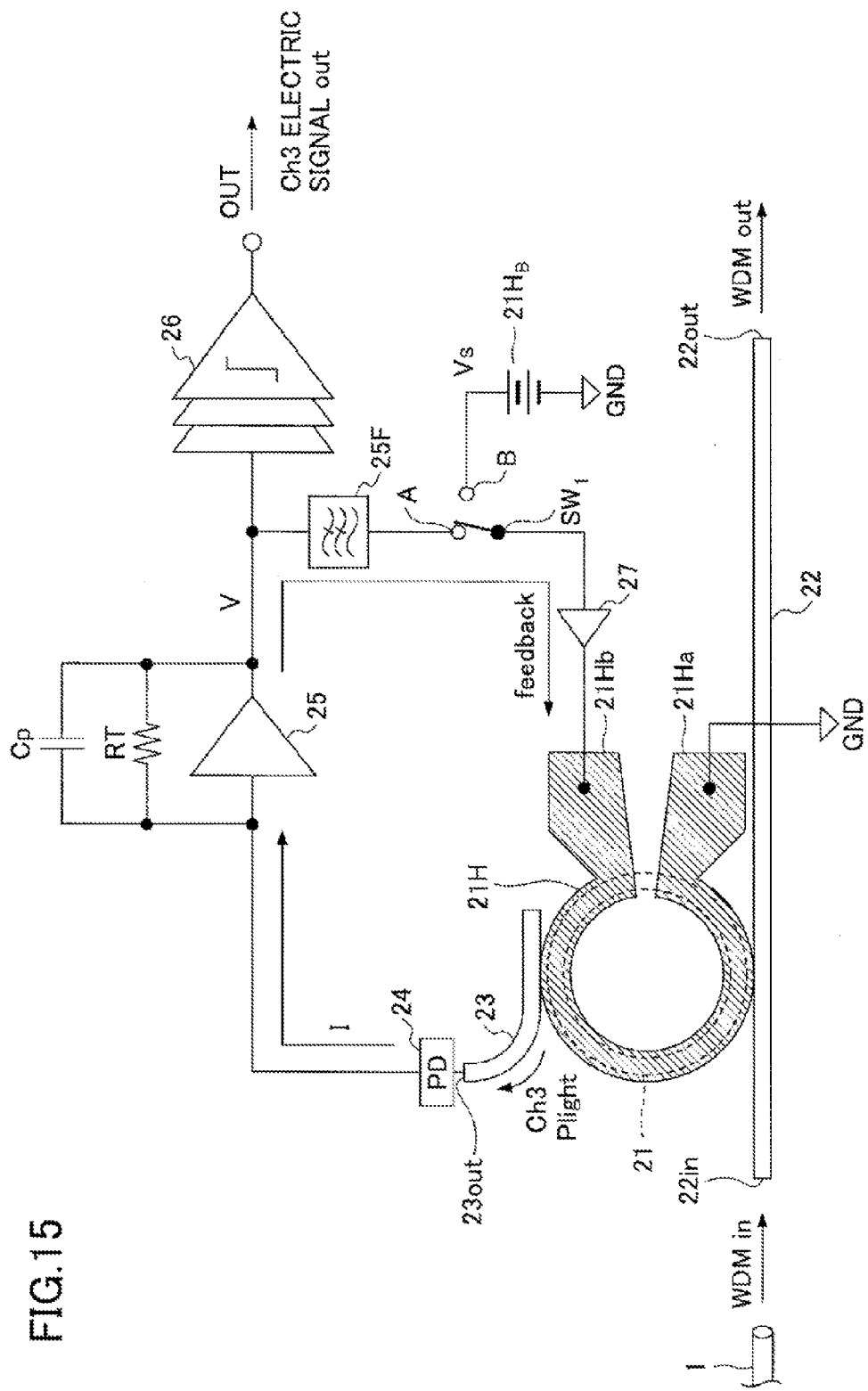
FIG. 15 is a block diagram representing another modification of the optical switch of FIG. 1.

More specifically, in the construction of FIG. 15, the linear amplifier 27 amplifies the output voltage V with such an amplification factor that the temperature of the ring resonator 21 exceeds a temperature $T\lambda$ that provides the resonant wavelength corresponding to the signal wavelength $\lambda 3$, and thus, it becomes possible to obtain the cross-point CP3 with certainty.

Figure 17:
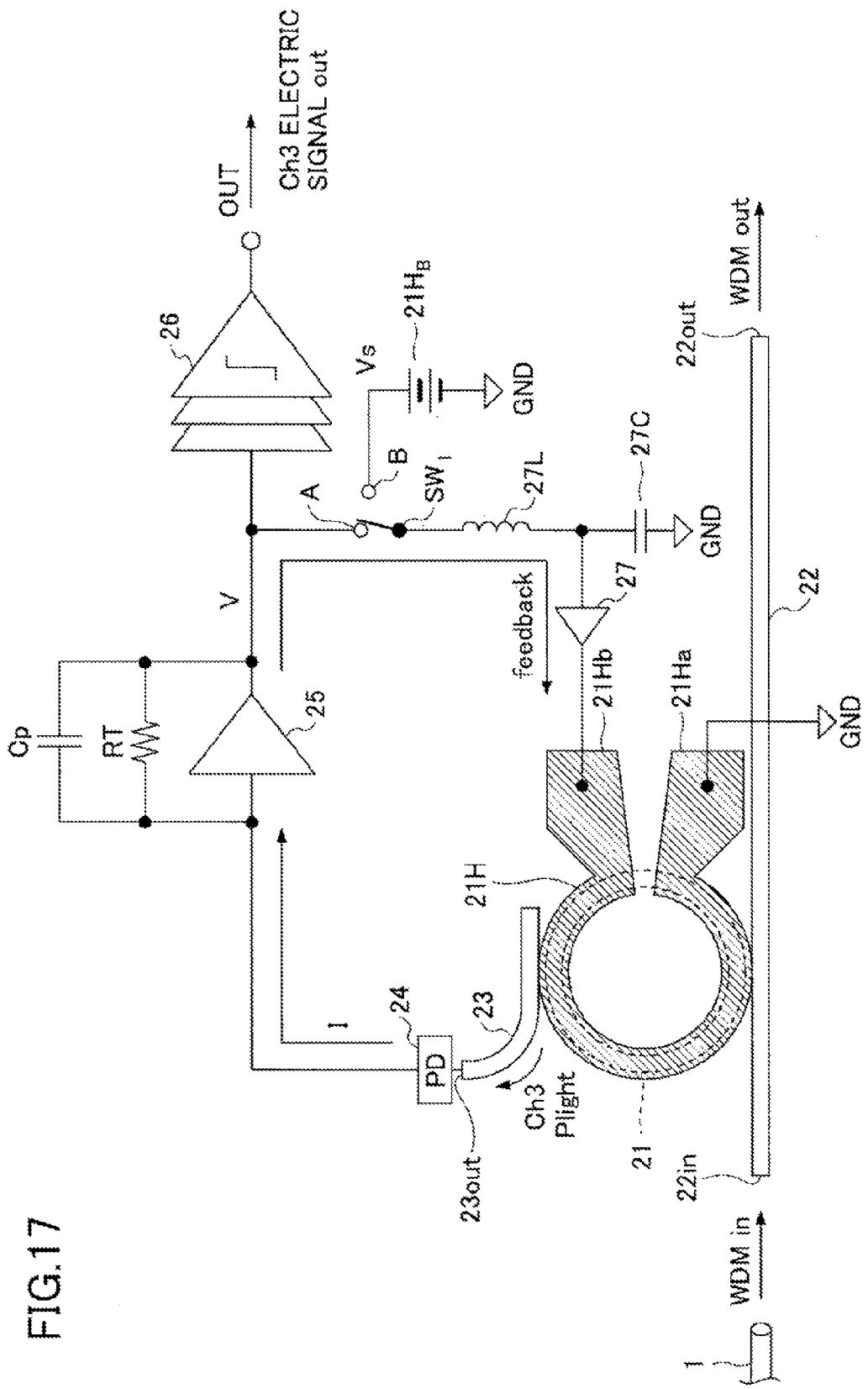
FIG. 17 is a circuit diagram representing an example of construction of the optical switch of FIG. 15.

FIG. 17 represents a circuit diagram of an example circuit that realizes the construction of FIG. 15.

Referring to FIG. 17, the low-pass filter 25F is constructed by a coil 27L inserted into the feedback path of the voltage signal V and a shunt capacitor 27C that eliminates high frequency components from the voltage signal passed through the coil 27L.

Figure 18:
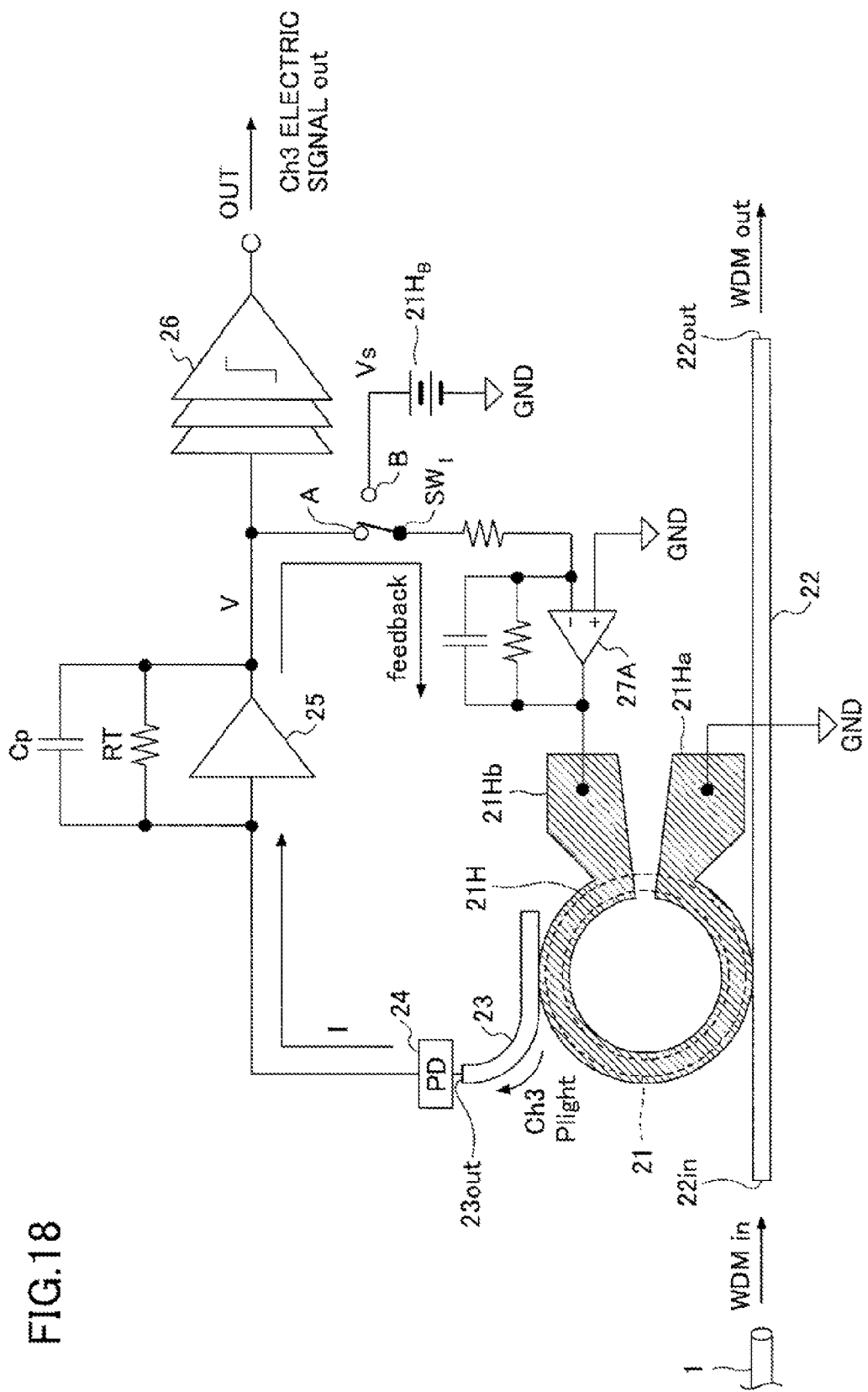
FIG. 18 is a circuit diagram representing another example of construction of the optical switch of FIG. 15.

FIG. 18 is a circuit diagram of another example circuit that realizes the construction of FIG. 15.

Referring to FIG. 18, the amplifier 27 is realized in the present embodiment by an operational amplifier 27A having a grounded non-inverting input terminal and an inverting input terminal supplied with the voltage signal V, wherein the operational amplifier 27A is provided with a feedback circuit in the form of a capacitor and a resistance provided between the output terminal and the inverting input terminal and functions as an active low-pass filter.

According to the present embodiment, there is attained a feedback operation that locks the resonant wavelength of the ring resonator to the wavelength of the signal component in the WDM signal by the ring resonator, the optical detector and the temperature regulator while utilizing the wavelength-temperature dependence of the ring resonator.

Second Embodiment

Figure 19:
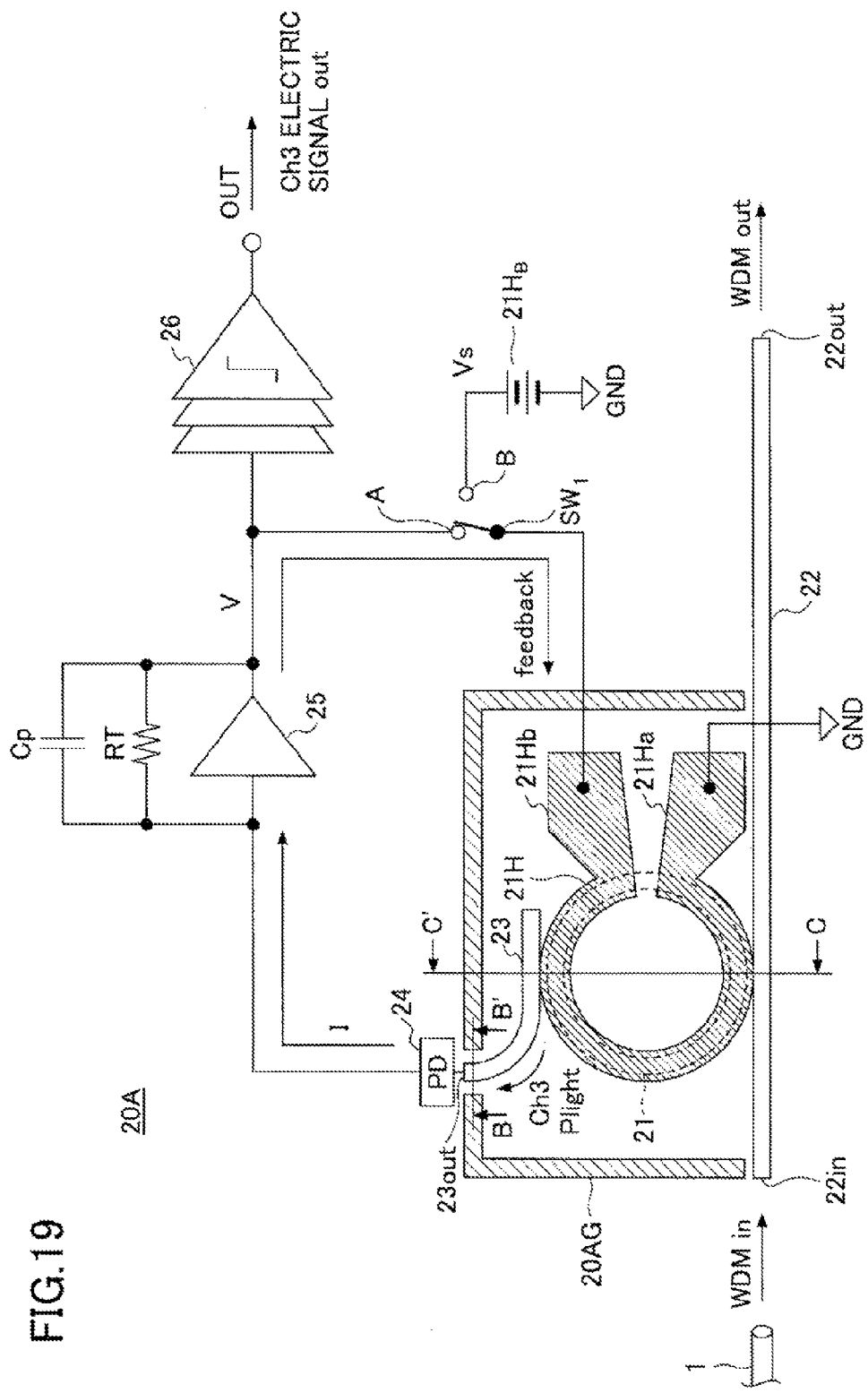
FIG. 19 is a block diagram representing the construction of an optical switch according to a second embodiment.
Figure 20:
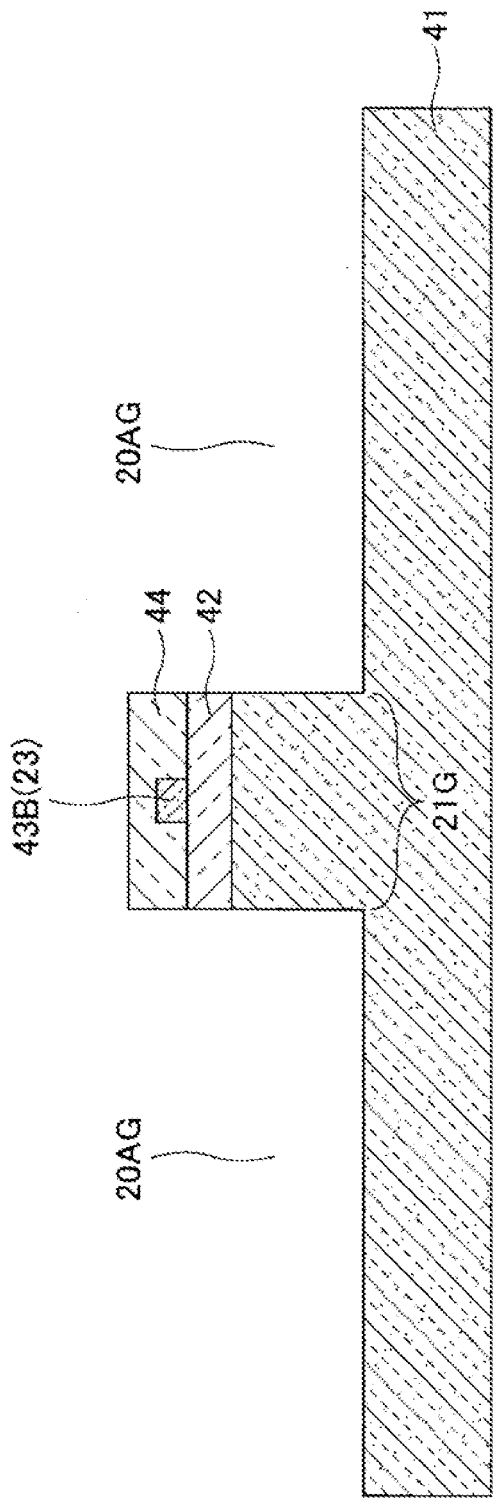
FIG. 20 is a cross-sectional diagram taken along a line B-B' of FIG. 19.
Figure 21:
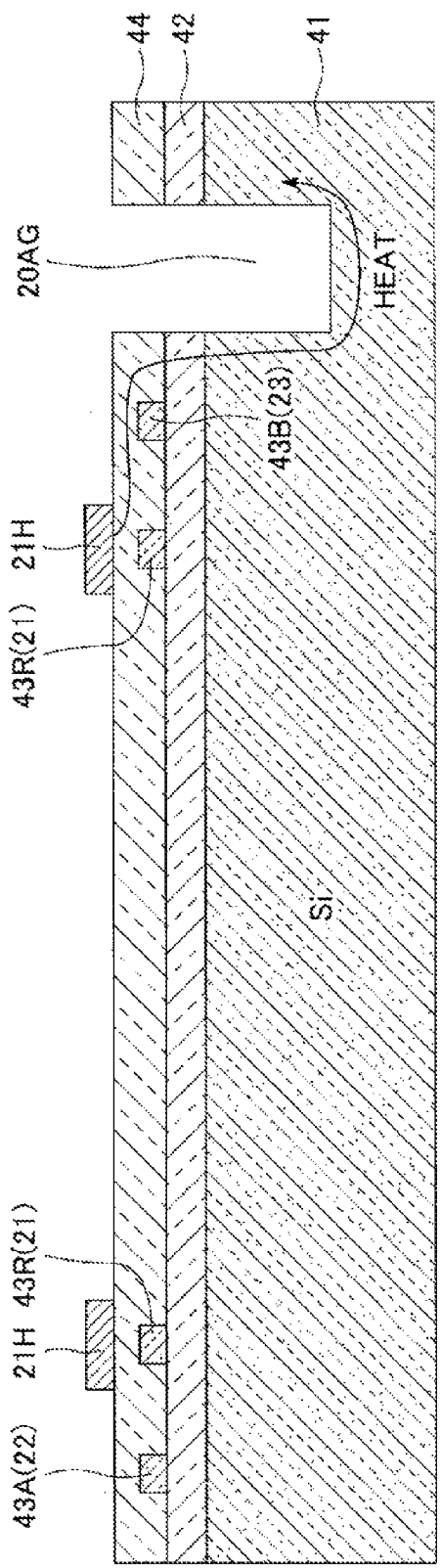
FIG. 21 is a cross-sectional diagram taken along a line C-C' of FIG. 19.

FIG. 19 is a plan view diagram representing the construction of an optical switch 20A according to a second embodiment while FIGS. 20 and 21 are cross-sectional diagrams respectively taken along lines B-B' and C-C' of FIG. 19. In the drawings, those parts explained before are designated by the same reference numerals and the description thereof will be omitted.

Referring to FIG. 19, the present embodiment includes a deep trench 20AG formed on the silicon substrate 41 to surround the ring resonator 21 with such a depth to reach the silicon substrate 41.

Referring to the cross-sectional diagram of FIG. 21, it will be understood that the heat produced by the heater 21H is transported along a path circumventing the trench 20AG at the underside thereof when the heat is transferred from the heater 21H to the photodiode 24. Thus, the region of the silicon substrate 41 formed with the ring resonator 21 is thermally isolated from the region in which the photodiode 24 is formed, and the problem that the heat generated by the heater 21H is conducted to the photodiode 24 and causes a change in the temperature therein is effectively suppressed. As will be noted from the cross-sectional diagram of FIG. 20, the region in which the photodiode 24 is formed and the region in which the ring resonator 21 is formed constitute together a narrowly restricted region 21G, and the flow of heat into the photodiode 24 is effectively suppressed.

Third Embodiment

Figure 22:
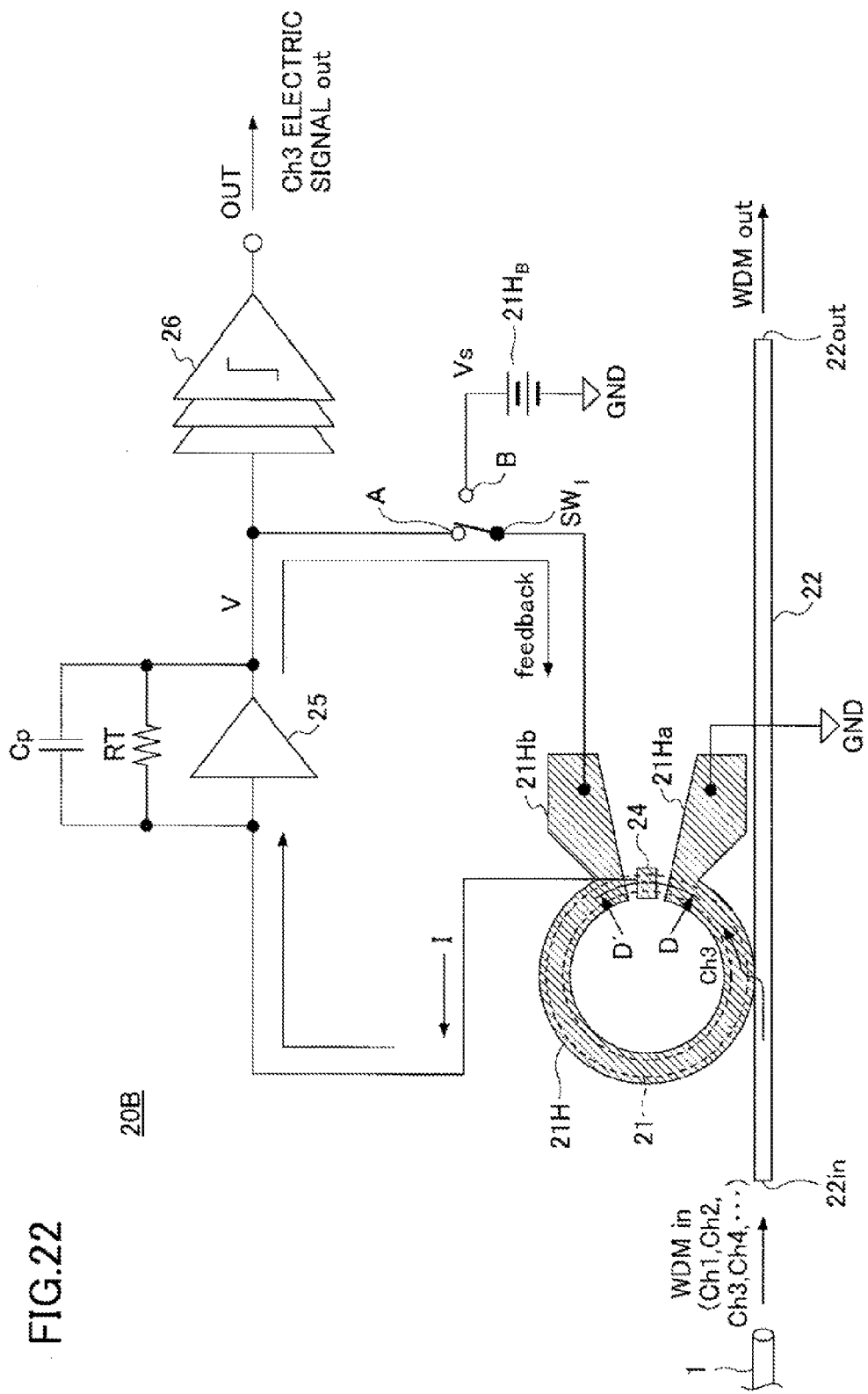
FIG. 22 is a block diagram representing the construction of an optical switch according to a third embodiment.
Figure 23:
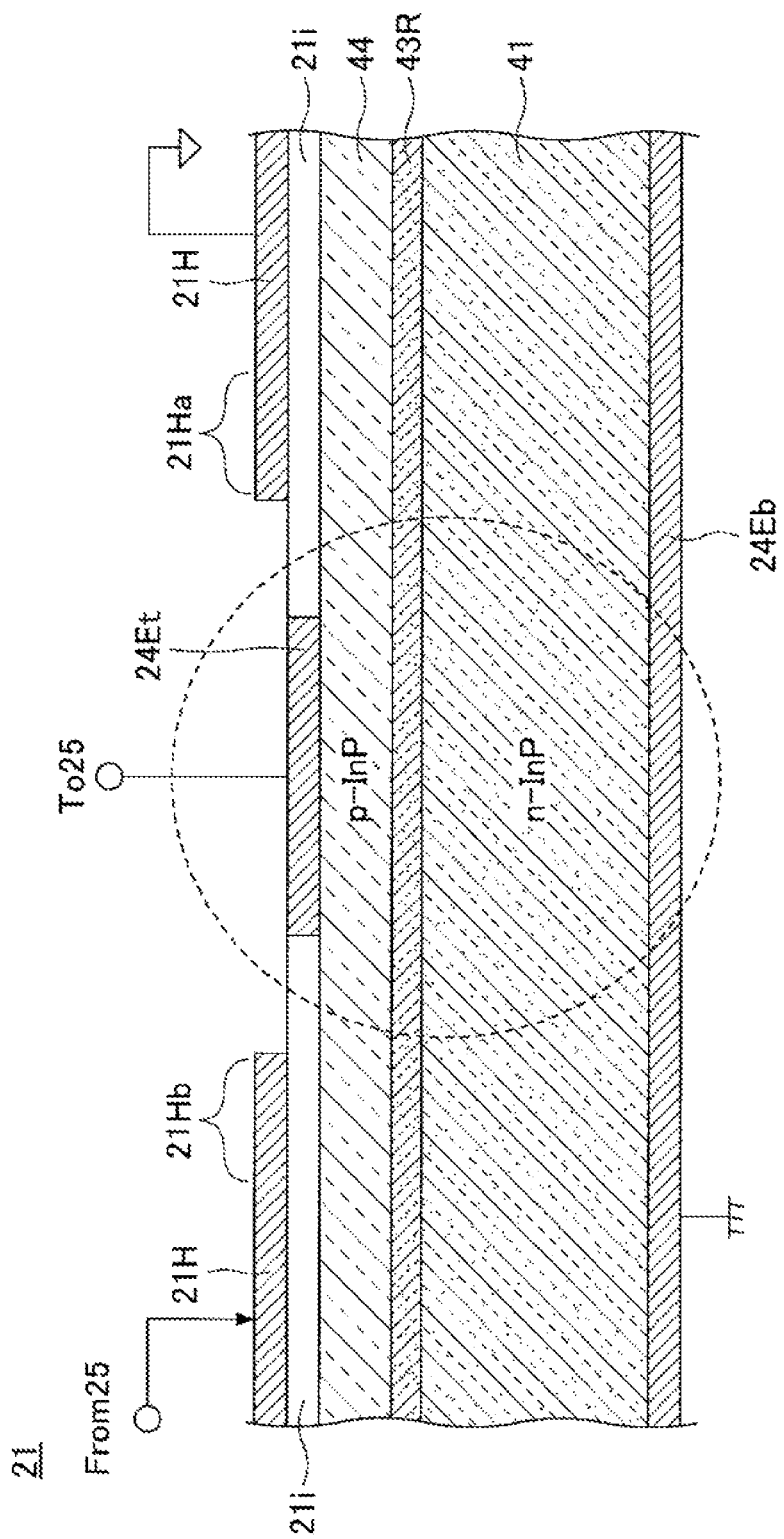
FIG. 23 is a cross-sectional diagram taken along a line D-D' of FIG. 22.

FIG. 22 is a plan view diagram representing the construction of an optical switch 20B according to a third embodiment, while FIG. 23 is a cross-sectional diagram taken along a line D-D' in FIG. 22.

Referring to the plan view diagram of FIG. 22, the present embodiment eliminates the second optical waveguide 23 and the photodiode 24 is provided in a part of the ring resonator 21 for detecting the optical signal component of the channel Ch3 while being located inside the ring resonator 21.

Referring to the cross-sectional diagram of FIG. 23, the present embodiment uses an n-type InP substrate for the substrate 41 and the core 43R is formed of an undoped InGaAsP layer formed epitaxially upon the InP substrate 41. While not illustrated, the present embodiment used an undoped InGaAsP layer for the core 43R of the waveguide 22. Further, the cladding 44 is formed by a p-type InP layer formed epitaxially on the substrate 41.

Further, with the present embodiment, the bottom electrode 24Eb of the photodiode 24 is formed on the bottom principal surface of the InP substrate uniformly, and a ring-shape pattern constituting the heater 21H is formed on the cladding 44. Further, in correspondence to the break of the heater 21H between the terminals 21Ha and 21Hb via an insulation film 21$i$, the top electrode 24Et of the photodiode 24 is formed on the cladding 44.

With such a construction, it becomes possible to omit the second optical waveguide 23 of the first embodiment and integrate the photodiode 24 into the ring resonator 21. Thereby, the size of the optical switch 20B can be reduced. As noted already, the optical switch 20 can be formed on a compound semiconductor substrate such as a GaAs substrate or InP substrate also in the first embodiment.

Figure 24:
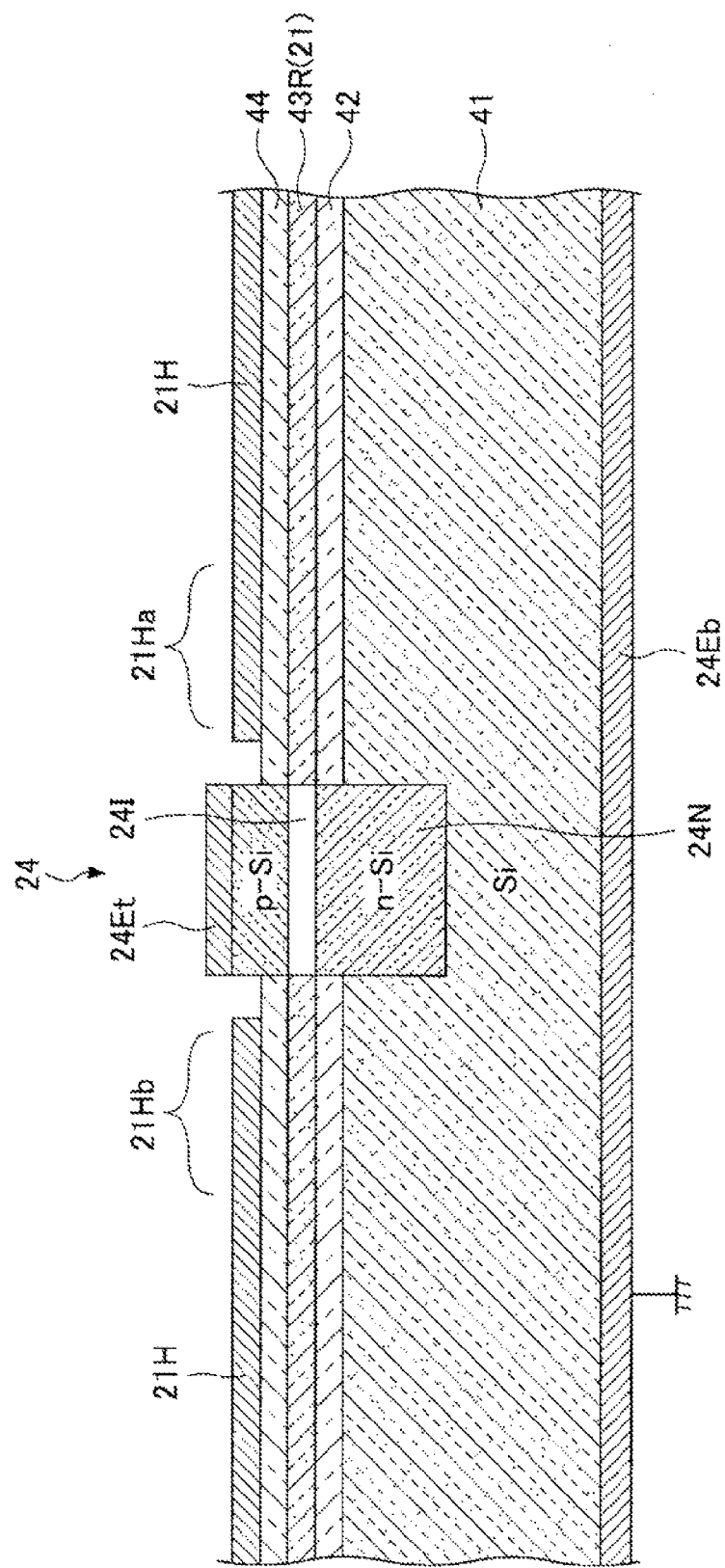
FIG. 24 is a cross-sectional diagram representing a modification of the optical switch of FIG. 22 along a cross-section represented by a line D-D' in FIG. 22.

Further, with the present embodiment, too, it is also possible to construct the optical switch 20B by using the SOI substrate explained with reference to FIGS. 3 and 4 and integrate the photodiode similar to the construction of FIG. 5 into the break of the ring resonator 21. In the modification of FIG. 24, the bottom electrode 24Eb may be extended perpendicularly to the plane of the drawing in the upward direction. In FIG. 24, those parts explained before are designated by the same reference numerals and the description thereof will be omitted.

Fourth Embodiment

Figure 25:
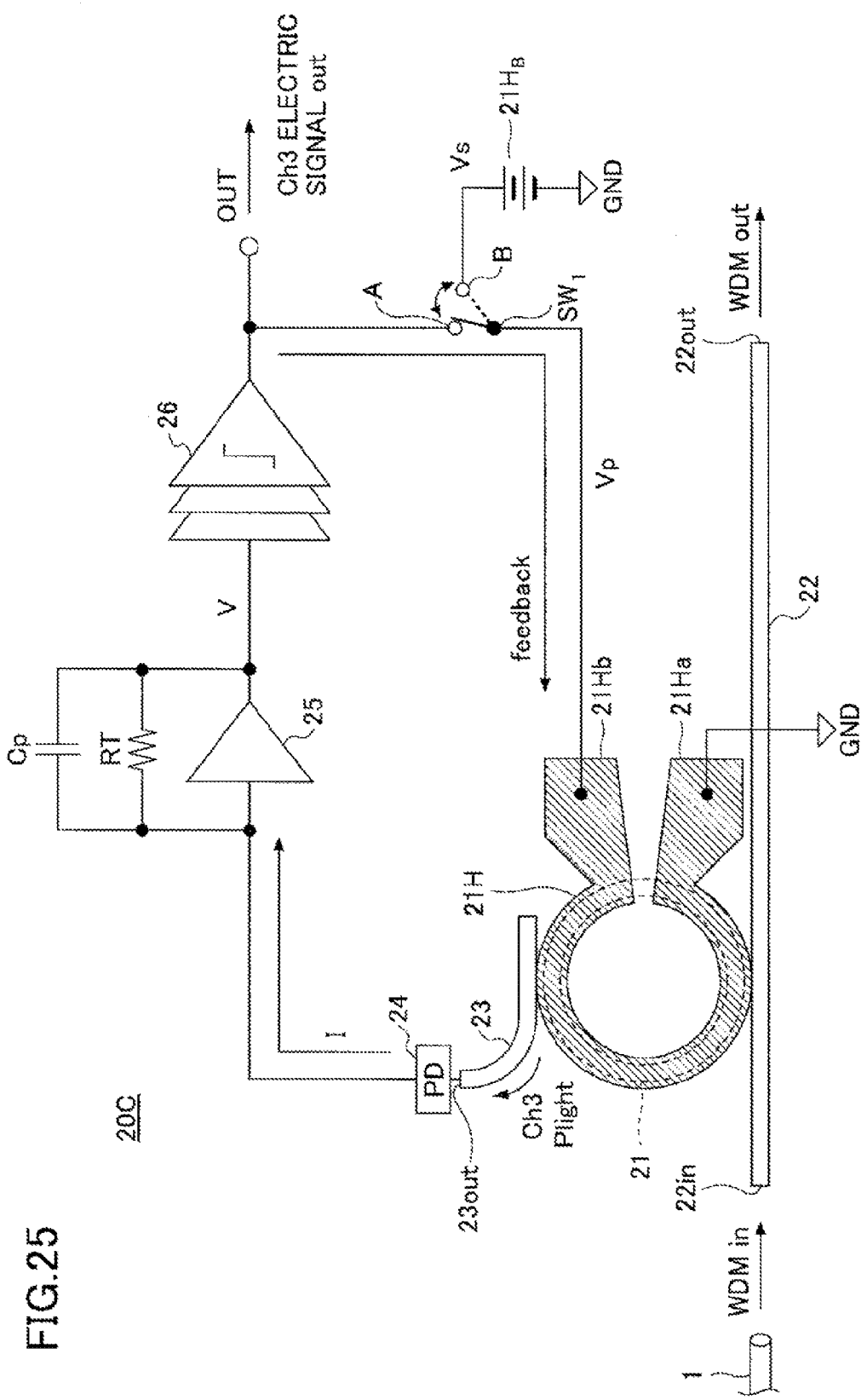
FIG. 25 is a block diagram representing the construction of an optical switch according to a fourth embodiment.

FIG. 25 is a plan view diagram representing the construction of an optical switch 20C according to a fourth embodiment. In the drawings, those parts explained before are designated by the same reference numerals and the description thereof will be omitted.

Referring to FIG. 25, the present embodiment is constructed such that the output voltage signal V of the trans-impedance amplifier 25 is supplied to the heater 21H after passing through the limiting amplifier 26 as an output voltage signal Vp of the limiting amplifier 26.

Figure 26:
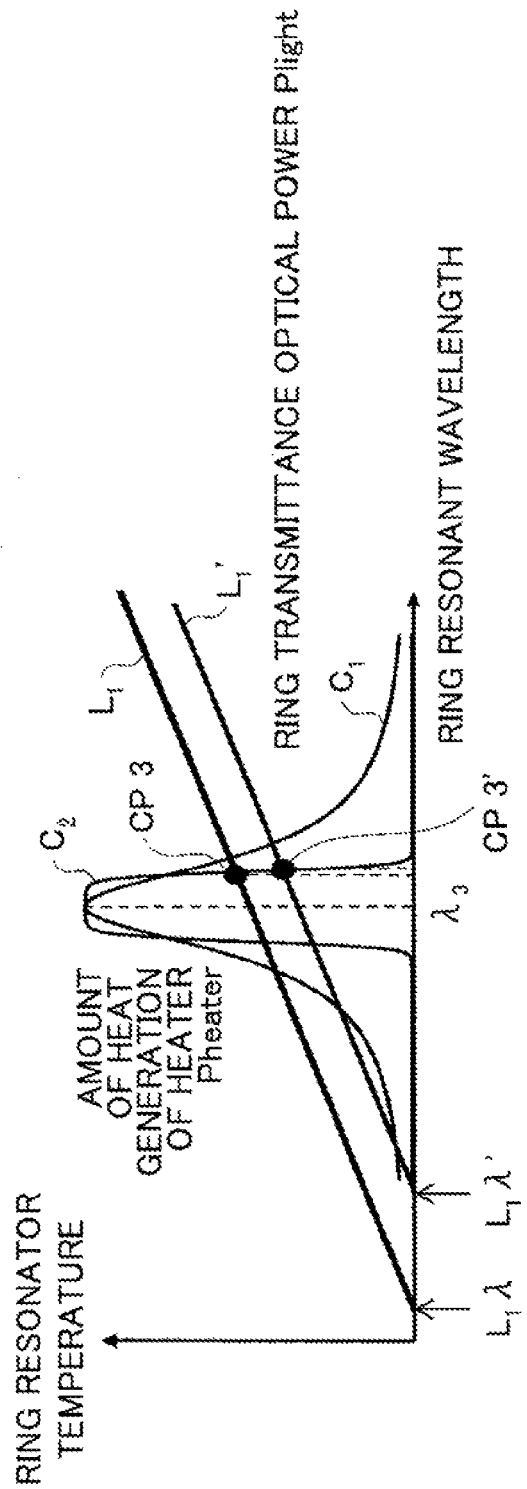
FIG. 26 is a diagram explaining the wavelength lock operation attained in the optical switch of FIG. 25.

As noted already, the limiting amplifier 26 is an amplifier performing a threshold operation, and as a result, the output voltage signal Vp is zero when the output voltage signal V of the trans-impedance amplifier is smaller that a threshold voltage. When the output voltage signal V exceeds the threshold voltage, on the other hand, the output voltage signal Vp takes a predetermined voltage. Thus, in the case the temperature of the ring-resonator 21 has changed and the voltage signal V has been changed accordingly, there may occur sharp increase in the voltage signal Vp supplied to the heater 21H in a predetermined wavelength range as represented in FIG. 26, and there is attained a wavelength dependence represented by a curve $C_2$, which is much sharper than the wavelength dependence of FIG. 9 represented by the curve $C_1$. Thus, the wavelength of the cross-point CP3 and the wavelength of the cross-point CP3' are almost coincident at the longer wavelength side of the curve $C_2$, and it becomes possible to lock the resonant wavelength of the ring resonator 21 to a wavelength almost identical to the desired predetermined wavelength by the feedback operation which uses the very sharp wavelength dependence as represented by the curve $C_2$, even in such a case in which the resonant wavelength of the ring resonator is offset significantly at the room temperature due to manufacturing error or the like of the ring resonator 21.

More specifically, consider the case in which the ring resonator 21 has a temperature dependence $L_1'$ for the resonant wavelength offset from the foregoing temperature dependence $L_1$ noted before due to the error at the time of manufacturing of the ring resonator 21 or the like. In such a case, the respective resonant wavelengths $L_1\lambda$ and $L_1\lambda'$ at the environmental temperature may be widely separated as represented in FIG. 26. Even in such a case, it will be noted that there is no substantial difference in the resonant wavelengths given by the cross-point CP3 and the cross-point CP3', which represent the wavelengths in which the feedback operation is active.

In FIG. 26, it should be noted that the slope of the lines $L_1$ and $L_1'$ is determined by thermo-optic effect of the material of the optical waveguide constituting the ring resonator 21 and generally does not depend upon the precision of patterning of the ring resonator 21.

Fifth Embodiment

Figure 27:
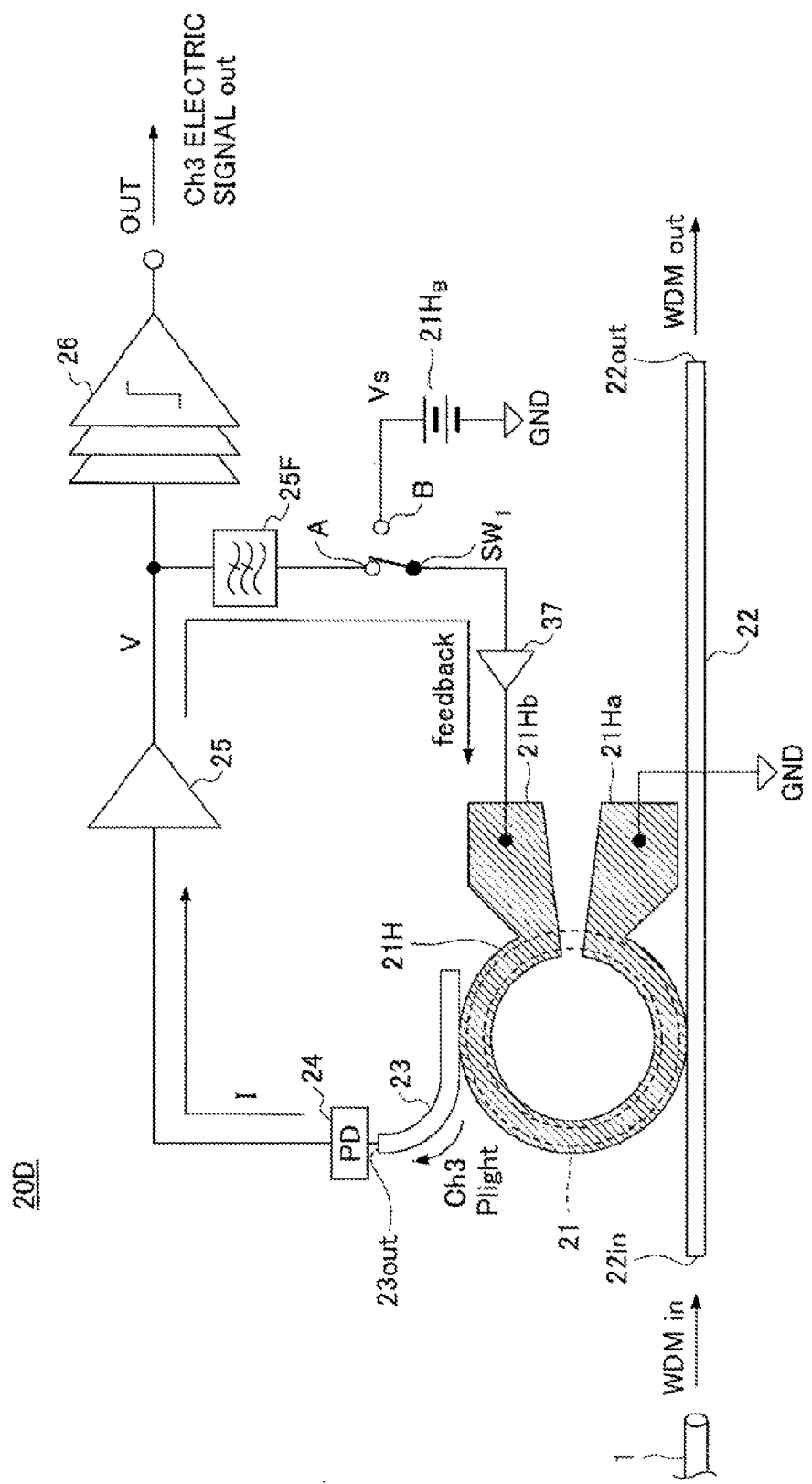
FIG. 27 is a block diagram representing the construction of an optical switch according to a fifth embodiment.

FIG. 27 represents the construction of an optical switch 20D according to a fifth embodiment. In the drawings, those parts explained before are designated by the same reference numerals and the description thereof will be omitted.

Figure 28:
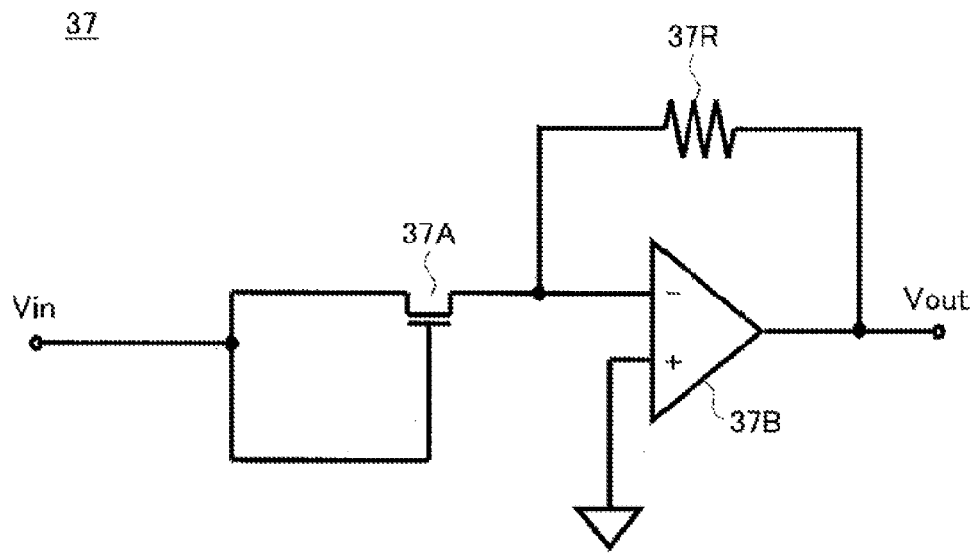
FIG. 28 is a circuit diagram representing an example of a non-linear amplifier used in the optical switch of FIG. 27.
Figure 29:
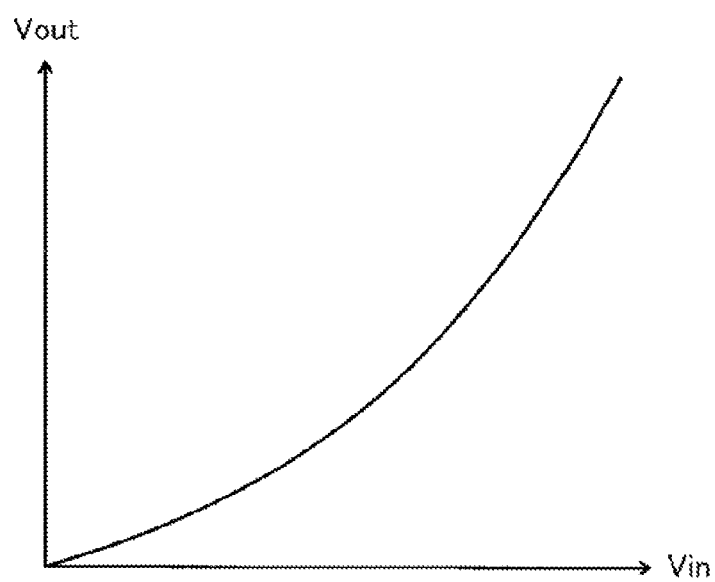
FIG. 29 is a diagram explaining the operational characteristics of the non-linear amplifier of FIG. 28.

Referring to FIG. 27, the optical switch 20D has a construction similar to that of the optical switch of FIG. 15 except that there is provided a non-linear amplifier 37 having a construction represented in FIG. 28 and an input-output characteristic represented in FIG. 28 in place of the liner amplifier 29.

Referring to FIG. 28, the non-linear amplifier 37 comprises a MOS transistor 37A of diode connection supplied with an input signal Vin and an operational amplifier 37B provided with a feedback resistance 37R, wherein it can be seen that the operational amplifier 37B has an inverting input terminal supplied with an output voltage of the MOS transistor 37A and further a grounded non-inverting input terminal. The non-linear amplifier 27 has a parabolic input-output voltage characteristic represented in FIG. 28 and produces an output voltage Vout in response to the input voltage Vin in proportion to the square of the input voltage Vin, and thus in proportion to $Vin^2$.

FIG. 30A is a diagram explaining the feedback operation of the optical switch 20D that uses such a non-linear amplifier 37.

Referring to FIG. 30A, the resonance of the heat generation of the heater 21H and the wavelength of the ring resonator 21 becomes sharper than that of FIG. 30B corresponding to that of FIG. 10 similarly to the case of FIG. 26 because of the use of the non-linear amplifier that produces the output voltage Vout in proportion to the square of the input voltage Vin, and thus, there is caused little change in the resonator wavelength at the operational point 3 even when the line $L_1$ has been moved parallel to some extent.

Sixth Embodiment

Figure 31:
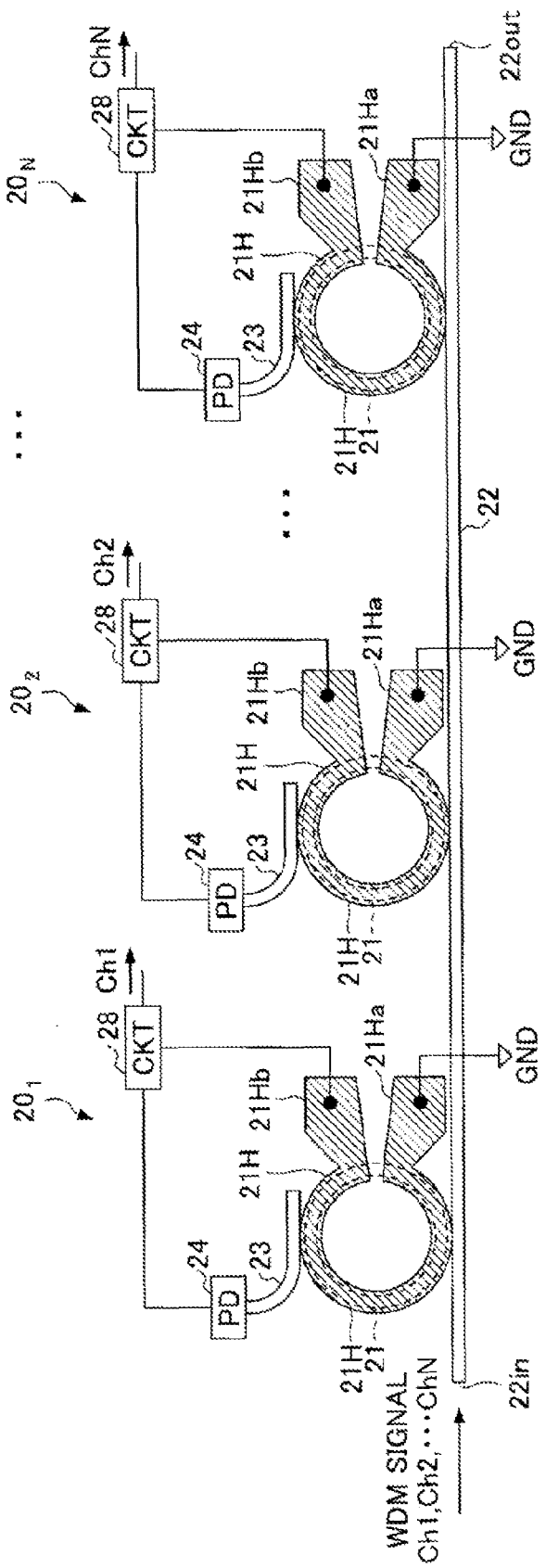
FIG. 31 is a block diagram representing the construction of a WDM signal demodulator according to a sixth embodiment.

FIG. 31 is a diagram representing the schematic construction of a WDM signal demultiplexer 30 that uses optical switches $20_1, 20_2, \ldots 20_N$ each having the construction of the optical switch 20 of FIG. 1.

Referring to FIG. 31, there is provided an optical waveguide on the SOI substrate 41 explained with reference to FIGS. 3 and 4, wherein a WDM signal is injected to an input end 22in of the optical waveguide 22 and the optical switches $20_1, 20_2, \ldots 20_N$ are coupled consecutively to the optical waveguide 22. In each of the optical switches $20_1, 20_2, \ldots 20_N$ represented in the illustration of FIG. 31, the trans-impedance amplifier 25, the limiting amplifier 26, the starter switch $SW_1$ and the starter voltage source $21H_B$ are collectively designated as an electric circuit 28. The optical signal components contained in the WDM signal and separated by the respective optical switches $20_1, 20_2, \ldots 20_N$ are outputted from the respective electric circuits 28 in the form of binary digital electric signals.

FIGS. 32A-32C are diagrams explaining the procedure of separating the signal components from the input WDM signal conducted by the respective optical switches $20_1, 20_2, \ldots 20_N$ represented in FIG. 31 by locking the respective resonant wavelengths.

Referring to FIG. 32A corresponding to the step 1 of the flowchart of FIG. 11 in which the optical switches $20_1, 20_2, \ldots 20_N$ are in the state left at the environmental temperature, it can be seen that the optical switches $20_1, 20_2, \ldots 20_N$ are manufactured such that the resonant wavelengths $\lambda_1', \lambda_2', \ldots \lambda_N'$ are shifted respectively toward the shorter wavelength side of the wavelengths $\lambda_1', \lambda_2', \ldots \lambda_N'$ of the corresponding optical signal components as represented by the dips of the transmittance.

Thus, in correspondence to the step 2 of FIG. 11, the starter switch $SW_1$ is switched to the contact B and the heater 21H is heated by the starter power source $21H_B$ in each of the optical switches $20_1, 20_2, \ldots 20_N$, such that the resonant wavelengths $\lambda_1', \lambda_2', \ldots \lambda_N'$ are shifted respectively to the longer wavelength side of the wavelengths $\lambda_1, \lambda_2, \ldots \lambda_N$ of the corresponding optical signal components as represented in FIG. 32B.

Further, in the step 3 of FIG. 11, the supply of the WDM signal is started, and the starter switch SW1 is switched to the contact A in the step 4. With this, the resonant wavelengths $\lambda_1', \lambda_2', \ldots \lambda_N'$ of the respective ring resonators 21 are locked close to the corresponding wavelengths $\lambda_1, \lambda_2, \ldots \lambda_N$ for the optical switches $20_2, 20_2, \ldots 20_N$, and the signal separation process of the step 5 is started.

While the foregoing explanation has been made for the case of using the optical switch 20 of FIG. 1, it should be noted that the signal separation of the present embodiment can be implemented similarly by using any of the optical switches 20A-20D explained previously.

While the present invention has been explained for preferred embodiments, the present invention is not limited to such specific embodiments and various variations and modifications may be made within the scope of the invention described in patent claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical switch, comprising:
    a substrate;
    a ring resonator formed on the substrate;
    a first waveguide, formed on the substrate, and configured to guide a WDM signal and optically couple to the ring resonator;
    an optical detector configured to detect an optical signal component in the ring resonator; and
    a temperature regulator, including an amplifier that amplifies an output signal of the optical detector, and driven in response to the output signal of the optical detector amplified by the amplifier, and configured to change a temperature of the ring resonator,
    wherein the ring resonator has a resonant wavelength corresponding to a wavelength of an optical signal component that constitutes the WDM signal,
    wherein the ring resonator, the optical detector, and the temperature regulator together constitute a feedback control system that locks the resonant wavelength of the ring resonator to the wavelength of the optical signal component in the WDM signal, and
    wherein the amplifier amplifies the output signal of the optical detector such that the temperature of the ring resonator increases above a temperature at which the resonant wavelength of the ring resonator and the wavelength of the optical signal component in the ring resonator coincide.

2. The optical switch as claimed in claim 1, wherein the temperature regulator includes
    a heater configured to heat the ring resonator,
    a driving power source configured to drive the heater, and
    a starter switch configured to select, when operated, one of the optical detector and the driving source as a selected device, and supply an output of the selected device to the heater.

3. The optical switch as claimed in claim 1, further comprising:
    a signal processing unit configured to process the output signal of the optical detector,
    wherein the signal processing unit includes a current-to-voltage conversion device configured to convert the output signal of the optical detector from a current signal into a voltage signal, and
    wherein the temperature regulator is driven by the voltage signal converted by the current-to-voltage conversion device.

4. The optical switch as claimed in claim 1, wherein the temperature regulator includes
    a low-pass filter configured to eliminate a high-frequency component from the output signal of the optical detector,
    wherein the temperature regulator is driven in response to the output signal of the optical detector, that is eliminated of the high-frequency component by the low-pass filter, and changes the temperature of the ring resonator.

5. The optical switch as claimed in claim 1, wherein the amplifier comprises a linear amplifier.

6. The optical switch as claimed in claim 1, wherein the amplifier comprises a non-linear amplifier.

7. The optical switch as claimed in claim 3, wherein the signal processing unit further includes
    a comparator configured to perform a threshold processing on the output signal of the optical detector,
    wherein the temperature regulator is driven in response to an output signal of the comparator.

8. The optical switch as claimed in claim 1, further comprising:
    a second waveguide formed on the substrate, configured to optically coupled to the ring resonator and guide a signal component of the WDM signal,
    wherein the optical detector is optically coupled to the second waveguide.

9. The optical switch as claimed in claim 8, wherein the optical resonator is formed in a first region on the substrate defined by a trench, the optical detector is formed in a second region outside the first region, and the second waveguide extends from the first region to the second region in an area where the trench is interrupted.

10. The optical switch as claimed in claim 1, wherein the optical detector is provided within the ring resonator and forms a part of the ring resonator.

11. An optical demodulator, comprising:
    a substrate;
    a waveguide, formed on the substrate and having first and second ends at opposite ends thereof, and configured to guide a WDM signal supplied to the first end thereof to the second end thereof; and
    a plurality of optical switches formed on the substrate consecutively along the waveguide,
    wherein each of the plurality of optical switches includes
        a ring resonator optically coupled to the waveguide and having a resonant wavelength corresponding to an optical signal component in the WDM signal;
        an optical detector configured to detect an optical signal component in the ring resonator;
        a signal processing unit configured to process an output signal of the optical detector to produce an electric signal corresponding to the optical signal component in the ring resonator; and
        a temperature regulator, including an amplifier that amplifies the optical signal of the optical detector, and driven in response to the output signal of the optical detector amplified by the amplifier, and configured to change a temperature of the ring resonator,
    wherein the ring resonator, the optical detector, and the temperature regulator together constitute a feedback control system that locks the resonant wavelength of the ring resonator to the wavelength of the optical signal component in the WDM signal, and
    wherein the amplifier amplifies the output signal of the optical detector such that the temperature of the ring resonator increases above a temperature at which the resonant wavelength of the ring resonator and the wavelength of the optical signal component in the ring resonator coincide.

12. The optical demodulator as claimed in claim 11, wherein the temperature regulator includes
    a heater configured to heat the ring resonator,
    a driving power source configured to drive the heater, and
    a starter switch configured to select, when operated, one of the optical detector and the driving source as a selected device, and supply an output of the selected device to the heater.

13. An optical demodulation method using an optical demodulator of claim 12, the demodulation method comprising:
    selecting the driving power source by the starter switch and heating the ring resonator by the heater to a temperature at which a resonant wavelength of the ring resonator is longer than a wavelength of the optical signal component, supplying the WDM signal to the waveguide, and after the selecting and the supplying, selecting the output signal of the optical detector by the starter switch and locking the wavelength of the ring resonator to the wavelength of the optical signal component in the WDM signal.

* * * * *